US011733700B2

(12) United States Patent
Theos et al.

(10) Patent No.: US 11,733,700 B2
(45) Date of Patent: Aug. 22, 2023

(54) AUTOMATING CONTROL OF AN INDUSTRIAL VEHICLE

(71) Applicant: Crown Equipment Corporation, New Bremen, OH (US)

(72) Inventors: Sebastian Theos, Vaterstetten (DE); Andreas Simon, Munich (DE); Alexander Peters, Bad Feilenbach (DE); Christian Molnar, Schwindegg (DE)

(73) Assignee: Crown Equipment Corporation, New Bremen, OH (US)

( * ) Notice: Subject to any disclaimer, the term of this patent is extended or adjusted under 35 U.S.C. 154(b) by 261 days.

(21) Appl. No.: 17/174,831

(22) Filed: Feb. 12, 2021

(65) Prior Publication Data

US 2021/0247770 A1 Aug. 12, 2021

Related U.S. Application Data

(60) Provisional application No. 62/975,386, filed on Feb. 12, 2020.

(51) Int. Cl.
*G05D 1/02* (2020.01)
*G05D 1/00* (2006.01)
(Continued)

(52) U.S. Cl.
CPC ......... *G05D 1/0212* (2013.01); *G05D 1/0088* (2013.01); *G06K 7/10* (2013.01);
(Continued)

(58) Field of Classification Search
CPC ...... G05D 1/0212; G05D 1/0088; G06K 7/10; G06Q 10/087
See application file for complete search history.

(56) References Cited

U.S. PATENT DOCUMENTS 9,080,866 B1   7/2015  Dowdall et al.
10,656,654 B2 * 5/2020  Li ........................... G06K 19/00
(Continued)

FOREIGN PATENT DOCUMENTS

EP        942345 A1    9/1999

OTHER PUBLICATIONS

International Search Report and Written Opinion of the International Searching Authority dated May 19, 2021 International Application No. PCT/US2021/017854; European Patent Office; Rijswijk, Netherlands.

(Continued)

*Primary Examiner* — Ramsey Refai
(74) *Attorney, Agent, or Firm* — Stevens & Showalter LLP

(57) ABSTRACT

A process for automating control of an industrial vehicle based on location comprises scanning an environment in a travel direction of the industrial vehicle, by using an optical scanner affixed to the industrial vehicle. A marker defined by a series of tags is identified by recursively receiving a reflection of the optical scanner; determining if the reflection is indicative of an optical tag; and concatenating the indication of an optical tag to the marker. Once the marker is identified, the marker is transformed into an environmental condition and a status of the vehicle is determined, where the status correlates to the environmental condition. Further, an automated control is applied on the industrial vehicle based on the environmental condition and the status of the industrial vehicle.

20 Claims, 14 Drawing Sheets

(51) Int. Cl.
*G06K 7/10* (2006.01)
*G06Q 10/087* (2023.01)

(52) U.S. Cl.
CPC ... *G06Q 10/087* (2013.01); *G05D 2201/0216* (2013.01); *G06K 2007/10485* (2013.01); *G06K 2007/10504* (2013.01)

(56) References Cited

U.S. PATENT DOCUMENTS

| | | | |
|---|---|---|---|
| 10,656,659 B2* | 5/2020 | Li | G05D 1/0214 |
| 2009/0030551 A1* | 1/2009 | Hein | G05D 1/0246 |
| | | | 340/541 |
| 2011/0121068 A1* | 5/2011 | Emanuel | B66F 9/0755 |
| | | | 235/375 |
| 2015/0253766 A1* | 9/2015 | Pettersson | G05B 19/41805 |
| | | | 700/168 |
| 2017/0029213 A1* | 2/2017 | Johnson | B25J 11/008 |
| 2017/0225891 A1* | 8/2017 | Elazary | B65G 1/1375 |
| 2018/0089616 A1 | 3/2018 | Jacobus et al. | |

OTHER PUBLICATIONS

Sebastian Theos et al.; Related Continuation U.S. Appl. No. 18/343,814; filed Jun. 29, 2023 entitled Automating Control of an Industrial Vehicle.

* cited by examiner

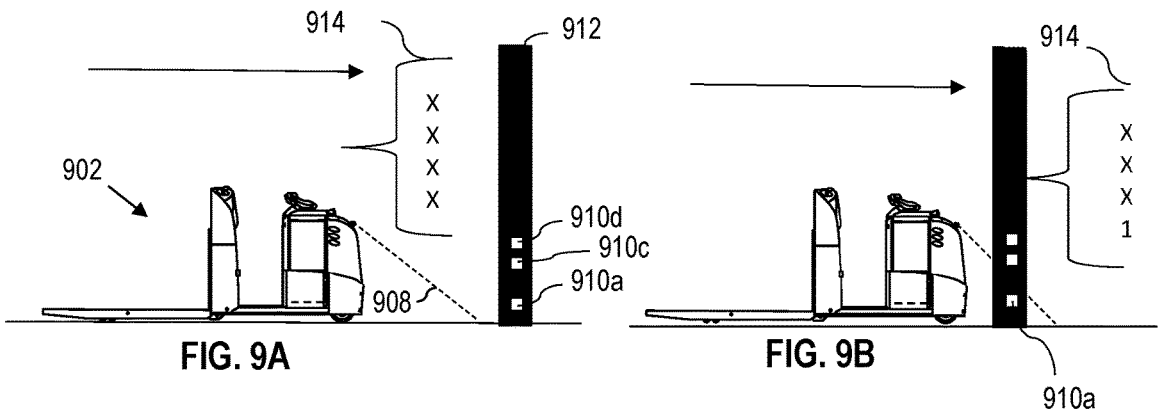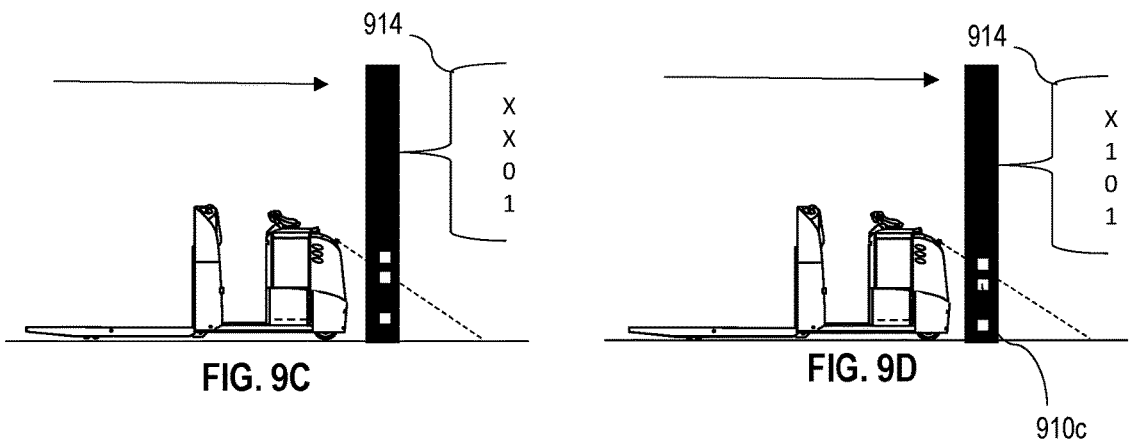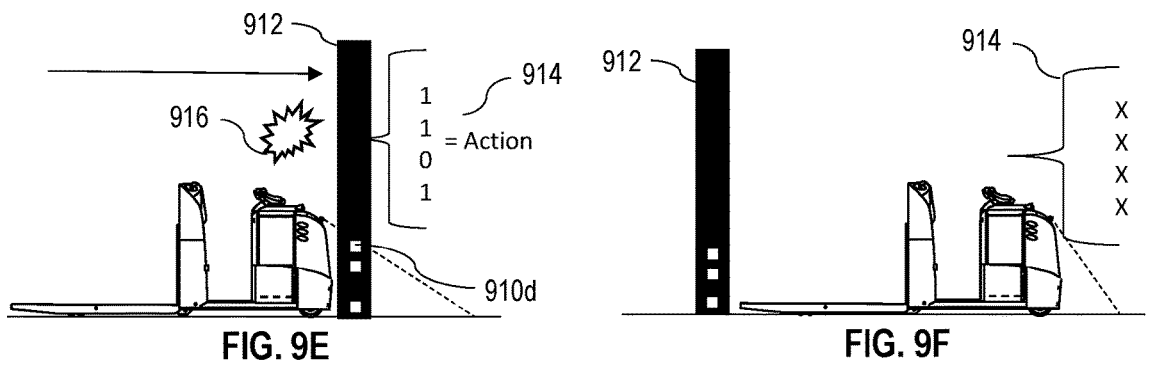

AUTOMATING CONTROL OF AN INDUSTRIAL VEHICLE

CROSS REFERENCE TO RELATED APPLICATIONS

This application claims the benefit of U.S. Provisional Patent Application Ser. No. 62/975,386, filed Feb. 12, 2020, entitled "AUTOMATING CONTROL OF AN INDUSTRIAL VEHICLE", the disclosure of which is hereby incorporated by reference.

BACKGROUND

Various aspects of the present disclosure relate generally to industrial vehicles and specifically to automating the control of industrial vehicles in defined environments.

Inventory (or "stock") of goods are often stored in warehouses (or other industrial environments) until an order is placed. Once the order is placed, the stock may be picked by an operator controlling an industrial vehicle (e.g., forklift, pallet truck, stock picker, etc.). Once the inventory is picked, it may be sent to a variety of destinations such as a distributor, or to the consumer directly.

BRIEF SUMMARY

According to aspects of the present disclosure, a process for automating control of an industrial vehicle based on location comprises scanning an environment using an optical scanner affixed to the industrial vehicle, wherein the optical scanner is fixed in an orientation that scans in the travel direction of the industrial vehicle. A marker defined by a series of tags is identified by recursively performing the following: receiving, by an optical detector on the industrial vehicle, a reflection indicative of a signal emitted by the optical scanner; measuring a received signal value of the reflection indicative of the signal emitted by the optical scanner; verifying whether the measured received signal value is indicative of an optical tag based upon the measured received signal value to create a present indication of an optical tag; and concatenating the present indication of an optical tag to the marker. Once the marker is identified, the marker is transformed into an environmental condition and a status of the vehicle is determined, where the status correlates to the environmental condition. Further, an automated control is applied on the industrial vehicle based on the environmental condition and the status of the industrial vehicle.

According to further aspects of the present disclosure, a process for automating control of an industrial vehicle based on location comprises scanning an environment using an optical scanner affixed to the industrial vehicle, wherein the optical scanner is an obstacle detection scanner and scans in a travel direction of the industrial vehicle. A reflection indicative of a signal emitted by the optical scanner is received by an optical detector on the industrial vehicle. Further, the process includes measuring a received signal value of the reflection indicative of the signal emitted by the optical scanner and verifying whether the measured received signal value is indicative of an optical tag based upon the measured received signal value to create an indication of an optical tag. The indication of an optical tag is transformed into an environmental condition and a status of the vehicle is determined, where the status correlates to the environmental condition. Moreover, an automated control is applied on the industrial vehicle based on the environmental condition and the status of the industrial vehicle.

Yet further, a process for automating control of an industrial vehicle based on location comprises scanning an environment using a first optical scanner affixed to the industrial vehicle, and a second optical scanner affixed to the industrial vehicle, wherein the first optical scanner and the second optical scanner scan in a travel direction of the industrial vehicle. Both a first reflection indicative of a signal emitted by the first optical scanner and a second reflection indicative of a signal emitted by the second optical scanner are received. Then, received signal values of the first and second reflections are measured. The process then verifies if the measured received signal values are indicative of first and second optical tags, which are then identified as a marker. Once the marker is identified, the marker is transformed into an environmental condition and a status of the vehicle is determined, where the status correlates to the environmental condition. Further, an automated control is applied on the industrial vehicle based on the environmental condition and the status of the industrial vehicle.

BRIEF DESCRIPTION OF THE SEVERAL VIEWS OF THE DRAWINGS

FIGS. 9A-9F illustrate an additional example implementation of an industrial vehicle that the process of FIG. 7 is executed upon according to aspects of the present disclosure;

FIG. 12A is at a first point in time and FIG. 12B is at a second point in time, according to aspects of the present disclosure.

DETAILED DESCRIPTION

According to various aspects of the present disclosure, systems and computer implemented processes provide information to an industrial vehicle, which may include the user of the industrial vehicle, from an industrial environment that relates to conditions within the environment. The disclosure herein improves the technology of location-based information exchange for industrial vehicles. In particular, various aspects of the present disclosure address the technical problem of providing location-based information relating to changes in the industrial environment (e.g., warehouse layout) to the industrial vehicle and its application users.

Warehouse layouts and structures may vary between retailers. Accordingly, for clarity purposes, an example industrial environment layout is illustrated below.

Example Industrial Environment Layout

Figure 1:
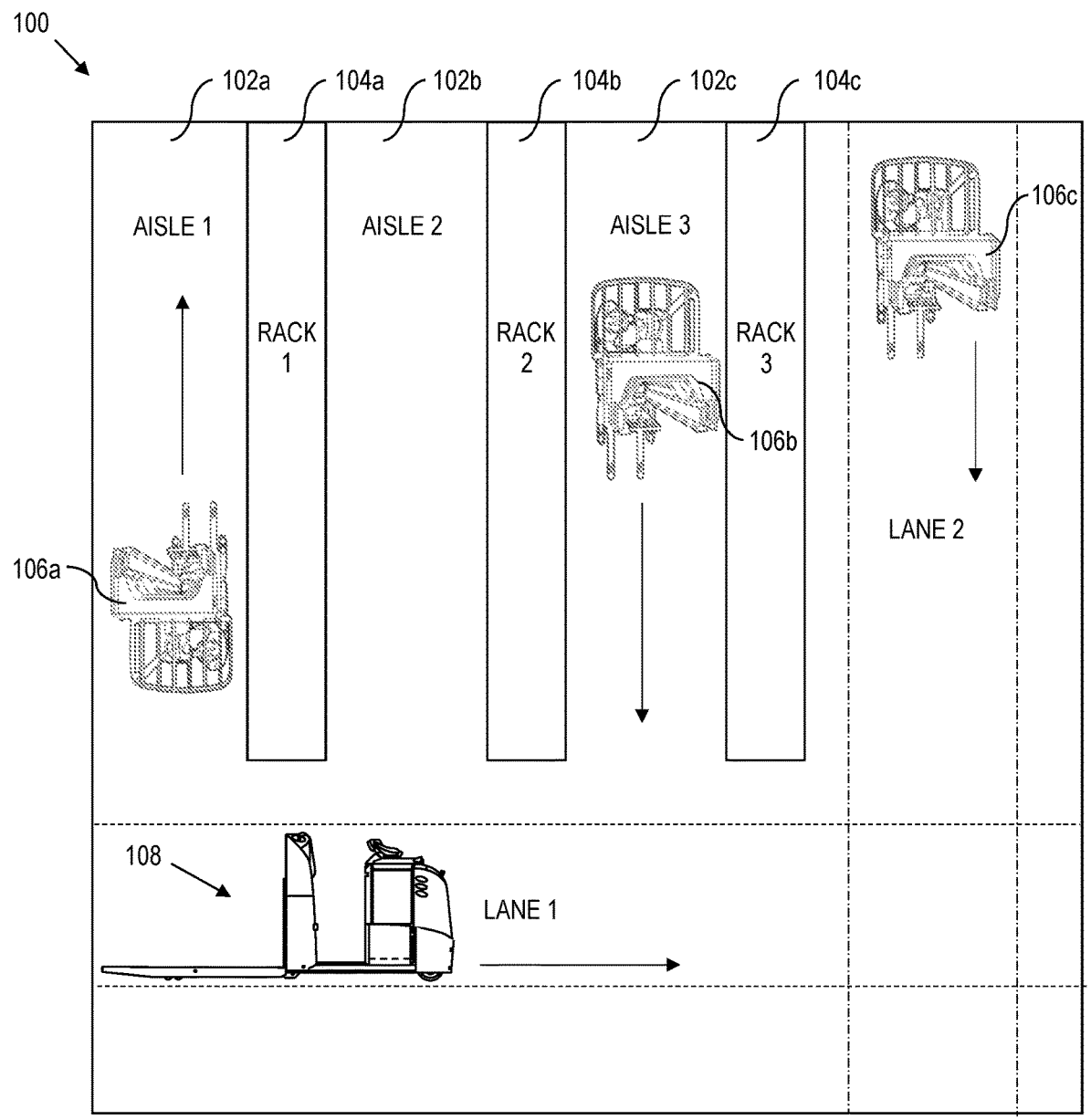
FIG. 1 is an example layout of an industrial environment, according to various aspects of the present disclosure.

Referring now to FIG. 1 an example of an industrial environment (e.g., warehouse, supply yard, loading dock, manufacturing facility, etc.) layout 100 is shown. In a typical stock picking operation, an operator of an industrial vehicle fills orders from available stock items that are located in storage areas provided down one or more aisles within the industrial environment. In this example industrial environment layout 100, there are three aisles 102*a*, 102*b*, 102*c* (collectively 102), which are separated by three racks 104*a*, 104*b*, 104*c* (collectively 104).

A rack is a structure that can be used to stock and store various items such as consumer products or materials and can vary in both size and structure. Examples of racks include, but are not limited to selective pallet racks, drive-in racks, drive-through racks, flow racks, gravity racks, and pushback racks. Racks may also have multiple vertical tiers to expand storage capacity.

During a typical stock picking operation, an operator may drive an industrial vehicle 106 to a first location where item(s) on a first order are to be picked (e.g., aisle 1). In a pick process, the operator retrieves the ordered stock item(s) from their associated storage area(s) (e.g., racks) and places the picked stock on a pallet, collection cage, other support structure carried by the industrial vehicle, or on the industrial vehicle itself. The operator then advances the industrial vehicle to the next location where a subsequent item is to be picked. The above process is repeated until all stock items on the order have been picked.

The operator may be required to repeat the pick process several hundred times per order. Moreover, the operator may be required to pick numerous orders per shift. As such, the operator may be required to spend a considerable amount of time relocating and repositioning the industrial vehicle, which reduces the time available for the operator to spend picking stock.

Further, it is not uncommon for multiple operators, each controlling an industrial vehicle, to pick orders simultaneously. For example, three traditional forklift trucks 106*a-c* (e.g., counterbalance forklifts, reach trucks, order pickers, stackers, etc.) and one pallet truck 108 (e.g., a low-level order picker, a quick pick remote truck, a center-control pallet truck, etc.) are shown.

According to aspects of the present disclosure, methods and systems are provided to mitigate collisions between industrial vehicles and other entities (e.g., other industrial vehicles, pedestrian, etc.). For example, various factors may affect a likelihood of a collision (e.g., size and structure of the racks), which may prevent an operator of an industrial vehicle 106*c* to visually see an operator of a different industrial vehicle 108, which may result in a collision between the industrial vehicles.

Moreover, some industrial vehicles may have remote-control capabilities. For example, a remote-control system for the industrial vehicle may comprise a wearable wireless remote-control device that is donned by the operator interacting with the industrial vehicle. The wearable wireless remote-control device may include a wireless transmitter and a travel control communicably coupled to a wireless transmitter and actuation of the travel control causes the wireless transmitter to wirelessly transmit a travel request to the industrial vehicle.

Also, while the inclusion of remote-control capabilities may increase productivity and efficiency of order picking, the inclusion of remote-control capabilities may also introduce a risk of an operator forgetting to manually stop the industrial vehicle before the industrial vehicle proceeds into another aisle or intersection.

Further, industrial environments may have varying traffic rules between different areas of the industrial environment. For example, a maximum allowed speed limit in an aisle may be different than a maximum speed allowed in a lane. Failure to abide by these speed limits or traffic rules can result in a collision as well.

Figure 2:
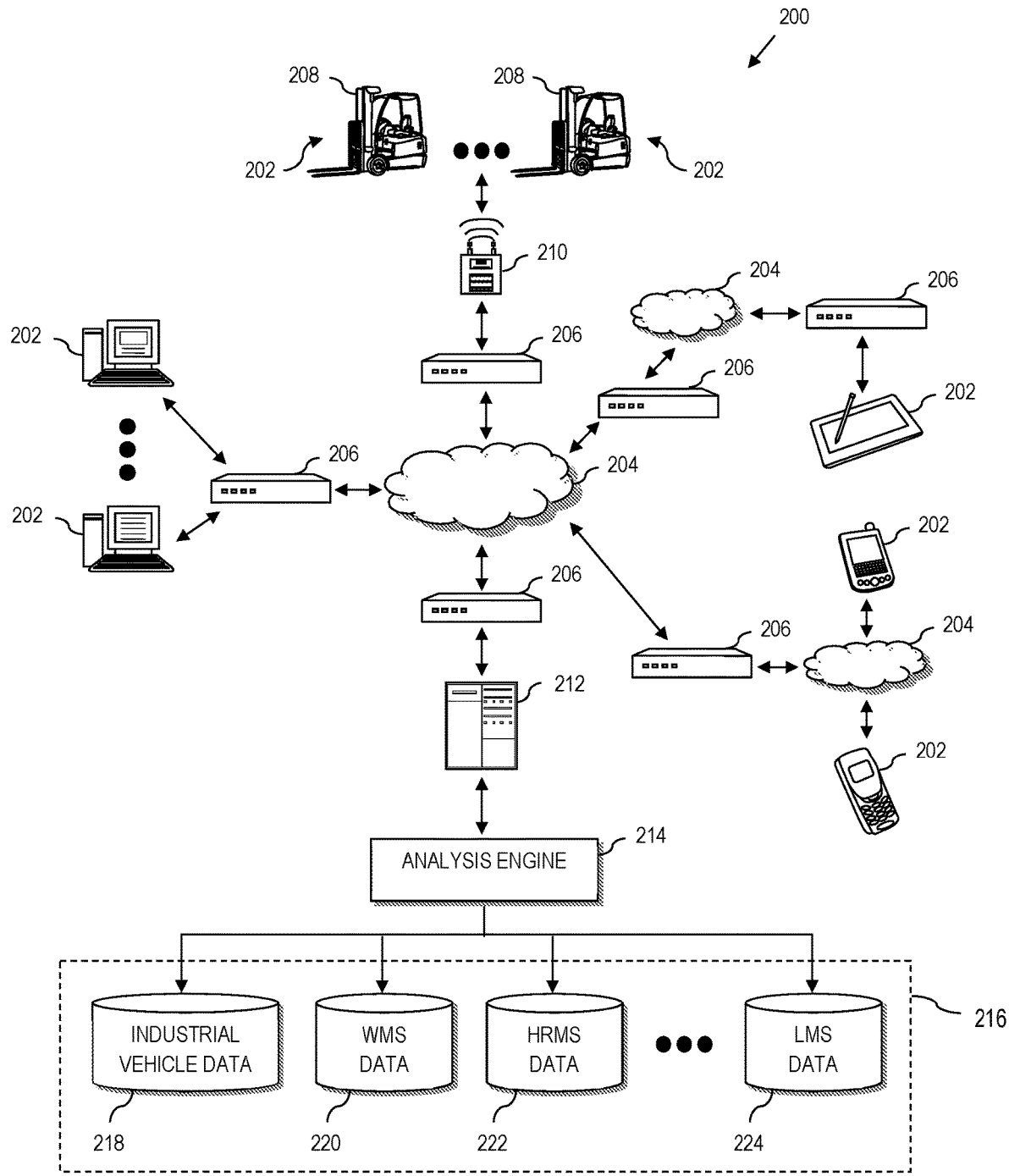
FIG. 2 is a flow diagram of a network system, according to aspects of the present disclosure.
Figure 3:
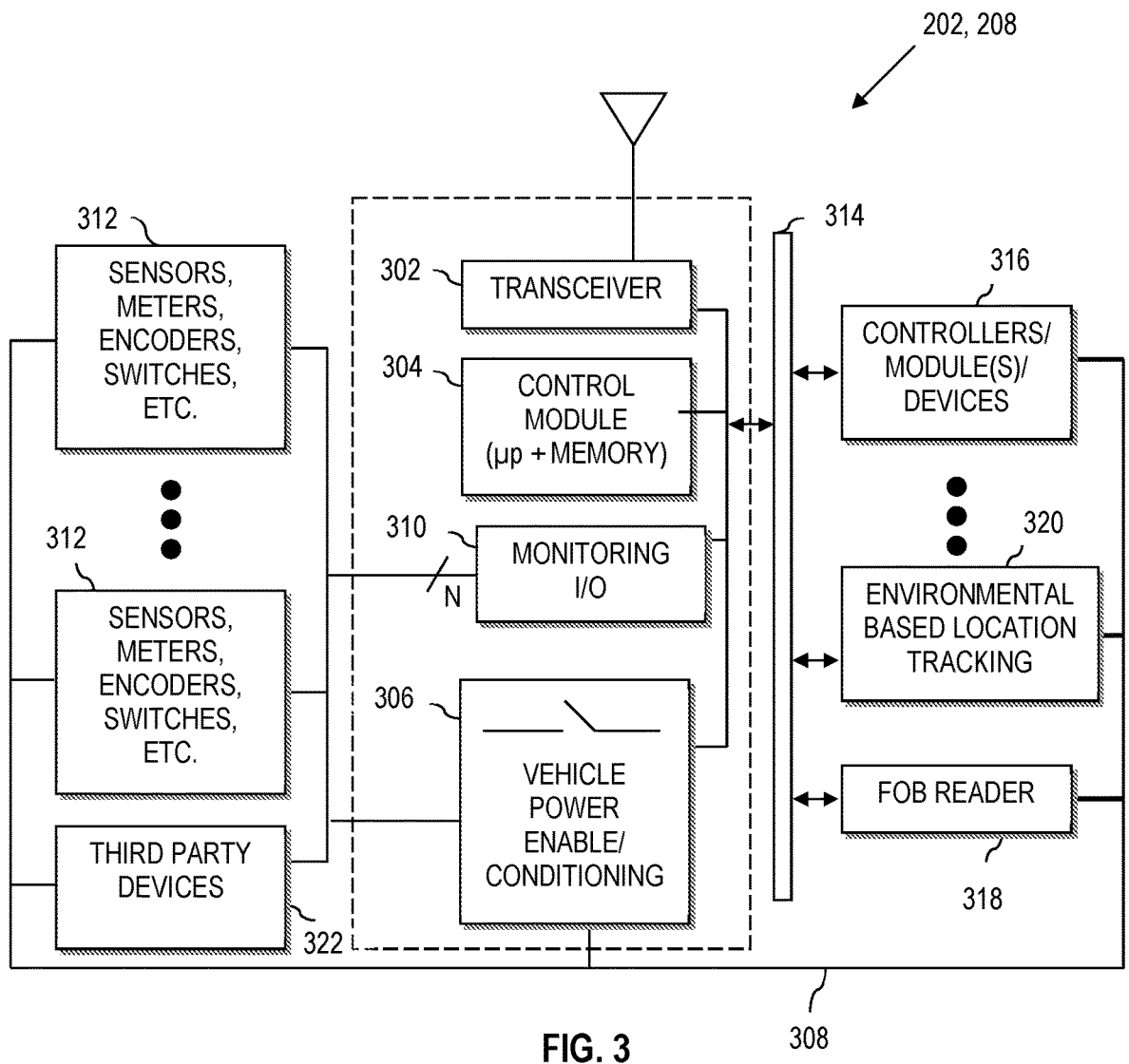
FIG. 3 is a hardware system diagram that can be used in an industrial vehicle, according to aspects of the present disclosure.

Accordingly, aspects of the present disclosure are directed toward a process for automating control of an industrial vehicle, based on the location of the industrial vehicle. In various embodiments, the process can account for the possibility of collisions between industrial vehicles, as well as potential varying traffic rules within an industrial environment setting. FIGS. 2 and 3 disclose example embodiments of systems and hardware that may be used with an industrial vehicle as described herein in greater detail.

System Overview

Referring now to the drawings and in particular to FIG. 2, a general diagram of a system 200 is illustrated according to various aspects of the present disclosure. The illustrated system 200 is a special purpose (particular) computing environment that includes a plurality of hardware processing devices (designated generally by the reference 202) that are linked together by one or more network(s) (designated generally by the reference 204).

The network(s) 204 provides communications links between the various processing devices 202 and may be supported by networking components 206 that interconnect the processing devices 202, including for example, routers, hubs, firewalls, network interfaces, wired or wireless communications links and corresponding interconnections, cellular stations and corresponding cellular conversion technologies (e.g., to convert between cellular and TCP/IP, etc.). Moreover, the network(s) 204 may comprise connections using one or more intranets, extranets, local area networks (LAN), wide area networks (WAN), wireless networks (Wi-Fi), the Internet, including the world wide web, cellular and/or other arrangements for enabling communication between the processing devices 202, in either real time or otherwise (e.g., via time shifting, batch processing, etc.).

A processing device 202 can be implemented as a server, personal computer, laptop computer, netbook computer, purpose-driven appliance, special purpose computing device and/or other device capable of communicating over the network 204. Other types of processing devices 202 include for example, personal data assistant (PDA) processors, palm computers, cellular devices including cellular mobile telephones and smart telephones, tablet computers, an electronic control unit (ECU), a display of the industrial vehicle, etc.

Still further, a processing device 202 is provided on one or more industrial vehicles 208 such as a forklift truck, reach truck, stock picker, automated guided vehicle, turret truck, tow tractor, rider pallet truck, walkie stacker truck, quick pick remote truck, etc. In the example configuration illustrated, the industrial vehicles 208 wirelessly communicate through one or more access points 210 to a corresponding networking component 206, which serves as a connection to the network 204. Alternatively, the industrial vehicles 208 can be equipped with Wi-Fi, cellular or other suitable technology that allows the processing device 202 on the industrial vehicle 208 to communicate directly with a remote device (e.g., over the networks 204).

The illustrated system 200 also includes a processing device implemented as a server 212 (e.g., a web server, file server, and/or other processing device) that supports an analysis engine 214 and corresponding data sources (collectively identified as data sources 216). The analysis engine 214 and data sources 216 provide domain-level resources to the industrial vehicles 208. Moreover, the data sources 216 store data related to activities of the industrial vehicles 208.

In an exemplary implementation, the data sources 216 include a collection of databases that store various types of information related to an operation (e.g., an industrial environment, distribution center, retail store, manufacturer, etc.). However, these data sources 216 need not be co-located. In the illustrative example, the data sources 216 include databases that tie processes executing for the benefit of the enterprise, from multiple, different domains. In the illustrated example, data sources 216 include an industrial vehicle information database 218 (supporting processes executing in an industrial vehicle operation domain), a warehouse management system (WMS) 220 (supporting processes executing in WMS domain that relate to movement and tracking of goods within the operating environment), a human resources management system (HRMS) 222 (supporting processes executing in an HRMS domain), a geo-feature management system 224 (supporting processes that utilize environmental-based location tracking data of industrial vehicles in a geo-domain), etc. The above list is not exhaustive and is intended to be illustrative only.

Still further, the industrial vehicles 208 may include a short range, direct communication with electronic badges that can be remote, but in relatively close proximity (by way of example, 15-20 meters) to a corresponding industrial vehicle 208. Electronic badges can also be positioned on machines, fixtures, equipment, other objects, an industrial vehicle operator, combinations thereof, etc. Electronic badges are discussed in greater detail in U.S. patent application Ser. No. 15/685,163 by Philip W. Swift entitled INDUSTRIAL ELECTRONIC BADGE filed Aug. 24, 2017, the entirety of which is hereby incorporated by reference.

In certain illustrative implementations, the industrial vehicles 208 themselves can communicate directly with each other via electronic badge communicator technology, e.g., via a short-range direct communication link, thus forming a mesh network, or temporary mesh network.

Industrial Vehicle

As noted above, in certain contexts and roles, a processing device 202 is provided on an industrial vehicle 208. Here, the processing device 202 is a special purpose, particular computer, such as a device that mounts to or is otherwise integrated with the industrial vehicle 208. The processing device 202 includes a processor coupled to memory to carry out instructions. However, the execution environment of the processing device 202 is further tied into the industrial vehicle 208 making it a particular machine different from a general-purpose computer.

For instance, an example processing device 202 on an industrial vehicle is a mobile asset information linking device (see information linking device 38) as set out in U.S. Pat. No. 8,060,400, the disclosure of which is incorporated by reference in its entirety. In certain illustrative implementations, the processing device 202 also communicates with components of the corresponding industrial vehicle 208 (e.g., via a vehicle network bus (e.g., CAN bus (controller area network bus)), short range wireless technology (e.g., via Bluetooth or other suitable approach), or other wired connection, examples of which are set out further in U.S. Pat. No. 8,060,400, already incorporated by reference.

Referring to FIG. 3, a processing device 202 is implemented as an information linking device that comprises the necessary circuitry to implement wireless communication, data and information processing, and wired (and optionally wireless) communication to components of the industrial vehicle. As a few illustrative examples, the processing device 202 includes a transceiver 302 for wireless communication, which is capable of both transmitting and receiving signals. Although a single transceiver 302 is illustrated for convenience, in practice, one or more wireless communication technologies may be provided. For instance, the transceiver 302 may be able to communicate with a remote server, e.g., server 212 and hence, interact with the analysis engine 214 of FIG. 2, via 802.11.xx across the access points 210 of FIG. 2. The transceiver 302 may also optionally support other wireless communication, such as cellular, Bluetooth, infrared (IR) or any other technology or combination of technologies. For instance, using a cellular to IP (Internet protocol) bridge, the transceiver 302 may be able to use a cellular signal to communicate directly with a remote server, e.g., a manufacturer server. The transceiver 302 may also communicate with a wireless remote-control device that controls the industrial vehicle 208. The remote-control device may be controlled by an industrial vehicle operator, or by the system 200.

The processing device 202 also comprises a control module 304, having a processor coupled to memory for implementing computer instructions. Additionally, the control module 304 implements processes such as operator log on, pre-use inspection checklists, data monitoring and other features, examples of which are described more fully in U.S. Pat. No. 8,060,400 to Wellman, already incorporated by reference herein.

The processing device 202 further includes vehicle power enabling circuitry 306 to selectively enable or disable the industrial vehicle 208. In certain implementations, the vehicle power enabling circuitry 306 can partially enable the industrial vehicle 208 for operation, or fully enable the industrial vehicle 208 for operation, e.g., depending upon proper operator login. For instance, the vehicle power enabling circuitry 306 can provide selective power to components via power line 308. Various functions of the industrial vehicle 208 can be controlled by the vehicle power enabling circuitry 306 (e.g., in conjunction with the control module 304) such as traction control, steering control, brake control, drive motors, etc.

Still further, the processing device 202 includes a monitoring input output (I/O) module 310 to communicate via wired or wireless connection to peripheral devices mounted to or otherwise on the industrial vehicle, such as sensors, meters, encoders, switches, etc. (collectively represented by reference numeral 312).

The processing device 202 is coupled to and/or communicates with other industrial vehicle system components via a suitable industrial vehicle network system 314, e.g., a vehicle network bus. The industrial vehicle network system 314 is any wired or wireless network, bus or other communications capability that allows electronic components of the industrial vehicle 208 to communicate with each other. As an example, the industrial vehicle network system may comprise a controller area network (CAN) bus, ZigBee, Bluetooth, Local Interconnect Network (LIN), time-triggered data-bus protocol (TTP) or other suitable communication strategy.

As will be described more fully herein, utilization of the industrial vehicle network system 314 enables seamless integration of the components of the processing device 202 on the industrial vehicle 208 into the native electronics including controllers of the industrial vehicle 208. Moreover, the monitoring I/O module 310 can bridge any electronic peripheral devices 312 to the industrial vehicle network system 314. For instance, as illustrated, the processing device 202 connects with, understands and is capable of communication with native vehicle components, such as controllers, modules, devices, bus enabled sensors, displays, lights, light bars, sound generating devices, headsets, microphones, haptic devices, etc. (collectively referred to by reference 316).

The processing device 202 can also communicate with a fob 318 (or keypad, card reader or any other device) for receiving operator log in identification. Still further, the processing device 202 can include a display and/or other features to provide desired processing capability.

According to yet further aspects of the present disclosure, an environmental based location tracking system 320 may be provided on the industrial vehicle 208, which can communicate across the industrial vehicle network system 314. The environmental based location tracking system 320 enables the industrial vehicle 208 to be spatially aware of its location within the industrial environment. The environmental based location tracking system 320 may comprise a local awareness system that utilizes markers, including RFID (radio-frequency identification), beacons, lights, or other external devices to allow spatial awareness within the industrial environment. The environmental based location tracking system 320 may use one or more of a global positioning system (GPS), or triangulation system to determine position. The environmental based location tracking system 320 may also use knowledge read from vehicle sensors, encoders, accelerometers, etc., or other system that allows location to be determined.

As a further example, the environmental based location tracking system 320 may include a transponder, and the position of the industrial vehicle may be triangulated within the industrial environment. Yet further, the environmental based location tracking system 320 may use combinations of the above and/or other technologies to determine the current (real-time) position of the industrial vehicle. As such, the position of the industrial vehicle can be continuously ascertained (e.g., every second or less) in certain implementations. Alternatively, other sampling intervals can be derived to continuously (e.g., at discrete defined time intervals, periodic or otherwise constant and recurring time intervals, intervals based upon interrupts, triggers or other measures) determine industrial vehicle position over time.

The processing device 202 may also be connected to other devices, e.g., third party devices 322 such as RFID scanners, displays, meters, weight sensors, fork load sensors, or other devices.

Single Optical Tag Embodiment

Figure 4:
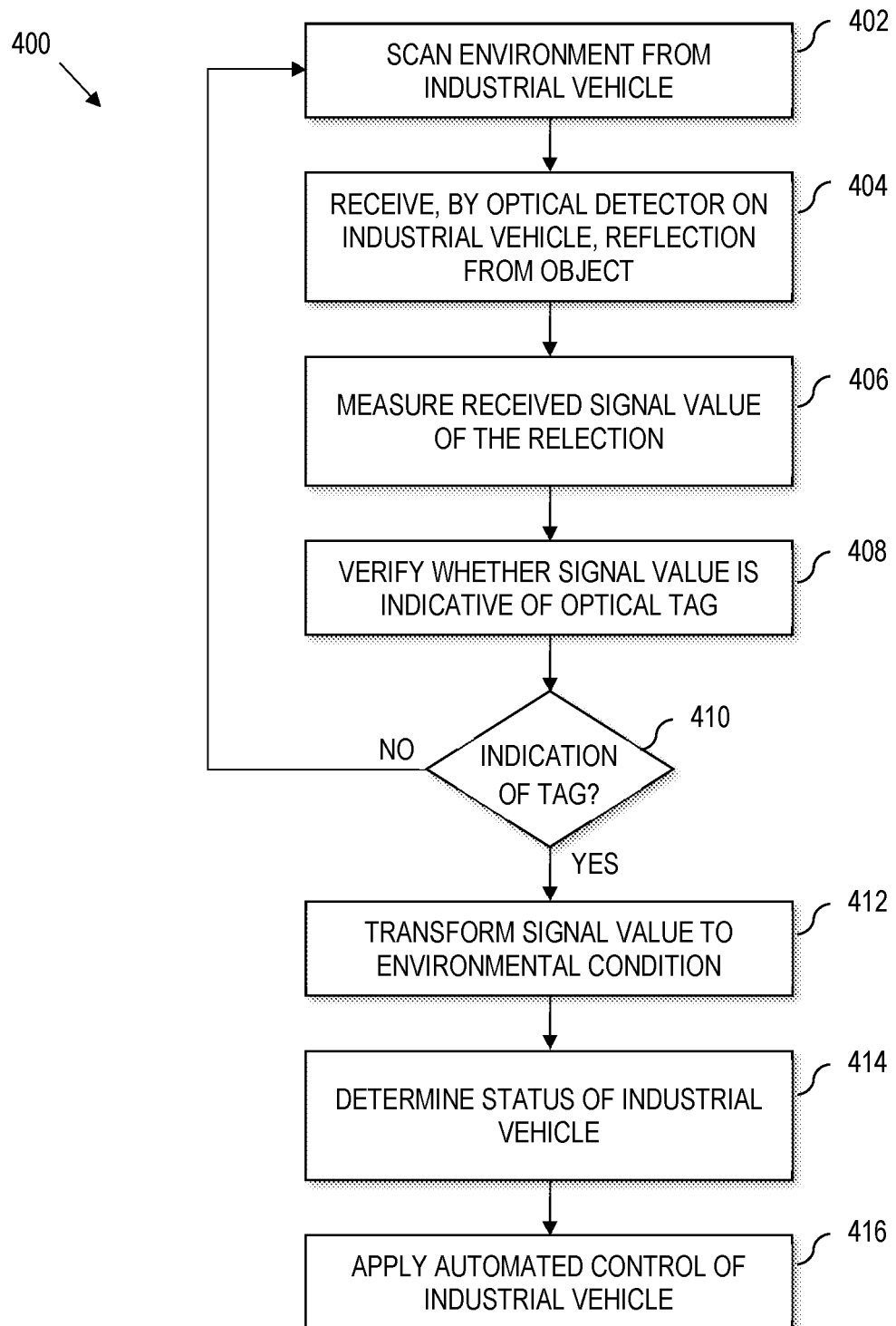
FIG. 4 is flow chart directed toward an embodiment for a process for automating control of an industrial vehicle based on location, according to aspects of the present disclosure.

Referring now to the drawings and in particular FIG. 4, a process 400 is illustrated for automating control of an industrial vehicle based on location. The process 400 can incorporate the various systems, hardware, and embodiments disclosed in FIGS. 1-3 and can be combined in any combination of components described with reference thereto. In this regard, not every disclosed component need be incorporated.

The process 400 comprises scanning at 402 an environment in a travel direction of the industrial vehicle, by using an optical scanner affixed to the industrial vehicle, wherein the optical scanner is fixed in an orientation that scans ahead of the forward travel direction of the industrial vehicle. Thus, the optical scanner emits a signal in front of the industrial vehicle. Further, the angle of scanning of the optical scanner can be greater than 180 degrees. Thus, even though the optical scanner emits a signal ahead of the vehicle, the optical sensor also emits the signal to a side of the vehicle and behind the vehicle at portions of the scan. Thus, the scanner can scan tags in front of the vehicle, alongside the vehicle, behind the vehicle, or combinations thereof.

With respect to the scanning technology used by the optical scanner to scan 402 the environment, a variety of scanning technologies may be used (e.g., optical mark reading technologies, optical character recognition technologies, intelligent character recognition technologies, etc.). In various embodiments, a scanning laser or laser beam that is used to determine obstacles in a path of the industrial vehicle is also used to scan the environment. In other words, a scanning device in addition to an obstacle scanning device is not required to scan for optical tags.

The process 400 further comprises receiving, at 404, by an optical detector on the industrial vehicle, a reflection indicative of the signal emitted by the optical scanner. In various embodiments, the optical scanner and the optical detector are paired together as a single device. As with the scanning device above, the optical detector may be an optical detector used to determine obstacles in a path of the industrial vehicle.

In an industrial environment setting, such as the example in FIG. 1, objects (e.g., a floor surface of a warehouse, an obstacle, an aisle, an optical tag, etc.) can reflect the laser beam back to the optical detector. For purposes of this disclosure, an optical tag is an object that reflects incoming light (e.g., laser beam from an optical scanner) at an intensity above a desired threshold. For example, the desired threshold may be based on received signal strength indication value as described in greater detail herein.

Structurally, the optical tag may be a uniform material such as a reflective tape. Alternatively, the optical tag may be an object that comprises multiple reflective surfaces therein (e.g., a surface with multiple reflective cells such as disk reflectors used on vehicles, bicycles, roadways, etc.).

The process 400 further comprises measuring, at 406, a received signal value of the reflection indicative of the signal emitted by the optical scanner and verifying at 408 whether the measured received signal value is indicative of an optical tag based upon the measured received signal value to create an indication of an optical tag.

In various embodiments, measuring the reflection includes measuring a received signal strength indicator (RSSI) value. Further, measuring the reflection may comprise generating a first result if the received signal value of the reflection is lower than a first threshold (e.g., approximately 10% signal strength), generating a second result if the received signal value of the reflection is between the first threshold and a second threshold (e.g., approximately 60% signal strength), and generating a third result if the received signal value of the reflection is above the second threshold. The percentage ranges herein are for illustrative purposes and are non-limiting. These thresholds are varied to account for environmental, equipment tolerance, power consumption, and other factors that may vary the measured reflection and operation of the system.

In an example scenario, a floor surface of an industrial environment may have a received signal value at 10% or below, a rack at an end of an aisle may have a received signal value between 10% and 60%, and an optical tag may have a received signal value of about 60% or greater. In another example, an optical tag that indicates a first value may have a received signal value between 5% and 50%, and an optical tag that indicates a second value may have a received signal value of about 50% or greater. As another example, an optical tag that indicates a first value may have a received signal value between 15% and 70%, and an optical tag that indicates a second value may have a received signal value of about 70% or greater. The received signal values are based on the strength of the received signal, not an encoded value placed on the signal that is the same regardless of strength.

At 410, if an indication of an optical tag is not detected, then the process loops back to 402 to continue looking for an optical tag. Also, if the received signal is determined to not be an optical tag, then the data received may be indicative of an object or an instruction for other purposes (e.g., aisle navigation for an automated vehicle, navigation assist, etc.). However, at 410, if an indication of an optical tag is detected, then the process 400 proceeds to 412, transforming the indication of an optical tag into an environmental condition. Further, at 414, a status of the industrial vehicle is determined, wherein the status correlates to the environmental condition, and at 416, an automated control is applied on the industrial vehicle based on the environmental condition and the status of the industrial vehicle.

An example of an environmental condition may be certain traffic rules for different sections of an industrial environment. For example, an operator may be required to perform an action at an end of an aisle before entering a lane. As another example, a maximum allowed speed limit in an aisle may be different than a maximum speed allowed in a lane. In a further example, traffic rules in the industrial environment may require operators to perform an action (e.g., beep the horn, strobe lights, etc.) when the industrial vehicle crosses from a lane to different lane (e.g., FIG. 1 where lane 1 and lane 2 intersect). In yet another example, remote-controlled travel may be prohibited in a section of the industrial environment.

Moreover, environmental conditions may be grouped together and associated with various signal value ranges from the reflection of the optical tag. For example, received signal values between a first threshold and a second threshold may transform into a hazard environmental condition, and received signal values above the second threshold may transform into a value that is associated with changes in traffic rules. Multiple combinations and permutations can be utilized in this manner. Data for transforming received signal values into an environmental condition may be located on the vehicle itself, a remote server, or both.

As disclosed above, the process 400 determines a status of the industrial vehicle, wherein the status correlates to the environmental condition. The status of the industrial vehicle includes but is not limited to the speed of the industrial vehicle, whether or not the industrial vehicle is under remote-control, elevation of forks, current weight load on the industrial vehicle, current location of the industrial vehicle, etcetera. The status of the industrial vehicle can be accessed or verified via a vehicle bus of the industrial vehicle (e.g., CAN bus). Further, data for determining a status of the industrial vehicle correlating to the environmental condition may be located on the vehicle itself, a remote server, or both.

If necessary, the process 400 applies an automated control on the industrial vehicle based on the environmental condition and the status of the industrial vehicle. In various embodiments, applying the automated control on the industrial vehicle based on the environmental condition and the status of the vehicle comprises at least one of generating a visual cue, activating an alarm on the industrial vehicle, overriding a manual travel control system, and overriding a remote-controlled travel control system of the industrial vehicle.

In another example, a first automated control may be applied to the industrial vehicle in response to the obstacle within a travel path of the industrial vehicle, and a second (different) automated control may be applied to the industrial vehicle in response to the obstacle outside the travel path of the industrial vehicle.

First Example of the Process of FIG. 4

Figure 5:
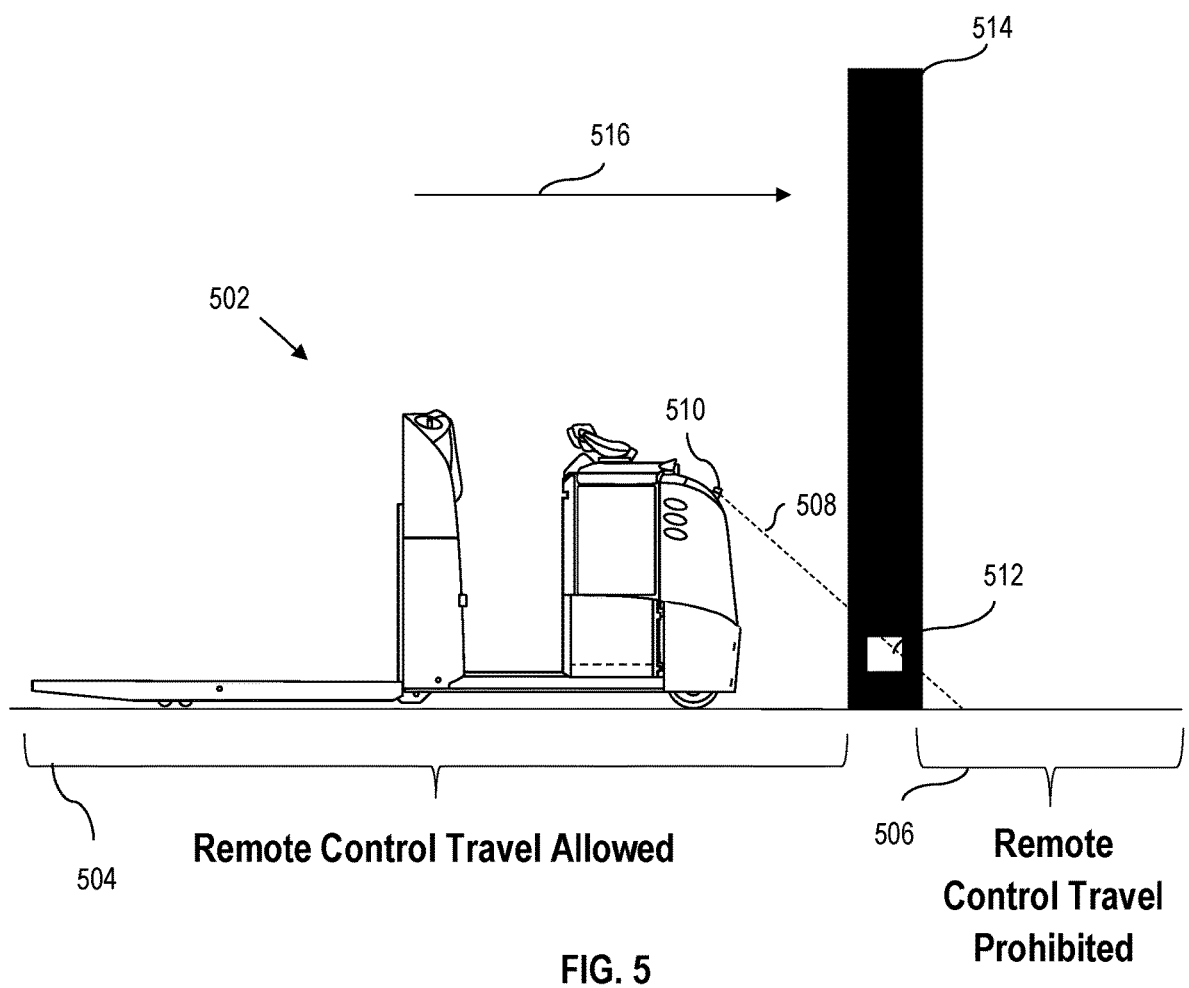
FIG. 5 illustrates an example implementation of an industrial vehicle that the process of FIG. 4 is executed upon according to aspects of the present disclosure.

Referring now to the drawings and in particular FIG. 5, which illustrates an example of an industrial vehicle 502 on which the process 400 is executed, travelling in an industrial environment. References to FIG. 5 can incorporate the various systems, hardware, and embodiments disclosed in FIGS. 1-4 and can be combined in any combination of components described with reference thereto. In this regard, not every disclosed component need be incorporated.

In this example, the industrial vehicle 502 is in a first zone 504 that allows operators to remote-control industrial vehicles. However, the industrial vehicle 502 is traveling toward a second zone 506 that prohibits operators from remotely controlling industrial vehicles. With use of information about which direction a vehicle is travelling (e.g., from the first zone 504 to the second zone 506), the zones and travel direction may be used to interact with the vehicle (e.g., prohibit remote-control in the zone). Determining a travel direction is discussed in greater detail below.

In FIG. 5, the industrial vehicle 502, which is being controlled by an operator remotely, scans (via a laser beam 508) an environment in a forward-facing direction using an optical scanner 510. For this example, the optical scanner 510 comprises an optical emitter (e.g., a laser) and an optical detector that receives reflections of the emitted laser beam 508 off objects within the industrial environment, such as an optical tag 512 and a rack 514. The optical emitter used in this example is a scanner that scans for objects in front of the industrial vehicle 502

The laser beam 508 bounces off the rack 514 and is received by an optical detector on the industrial vehicle 502, and a received signal value of the reflection is measured. When the laser beam reflects off the rack 514 itself, the received signal value is less than a threshold (e.g., 65% signal strength), which indicates that the object is not an optical tag, but is instead, a rack. In this example, the signal value from the rack 514 is then ignored. However, when the laser beam 508 reflects off the optical tag 512, the measured signal value exceeds the threshold, so the process verifies that an optical tag is present.

Upon verification of the optical tag 512, the measured signal value is transformed into an environmental condition. In the present example, the environmental condition is a change in traffic rules—namely, the second zone 506 prohibits remote-control of the industrial vehicle 502. Further, a status of the industrial vehicle is determined, where the status correlates to the environmental condition. In the present example, the status of the industrial vehicle 502 is that the industrial vehicle 502 is being remotely controlled. While there are other statuses associated with the industrial vehicle (e.g., moving at a certain speed, load present on the vehicle, etc.), the status that correlates to the environmental condition is that the industrial vehicle is being remotely controlled.

Further, an automated control is applied to the industrial vehicle based on the environmental condition and the status of the industrial vehicle. In the present example, the industrial vehicle is brought to a stop and remote-control travel capabilities are disabled on the industrial vehicle 502. Further, visual and audio cues are provided to the operator indicating that the vehicle has been brought to a stop and remote-control travel capabilities have been disabled. Other automated controls may be applied by the process 400 to the industrial vehicle 502 as well.

Second Example of the Process of FIG. 4

Figure 6:
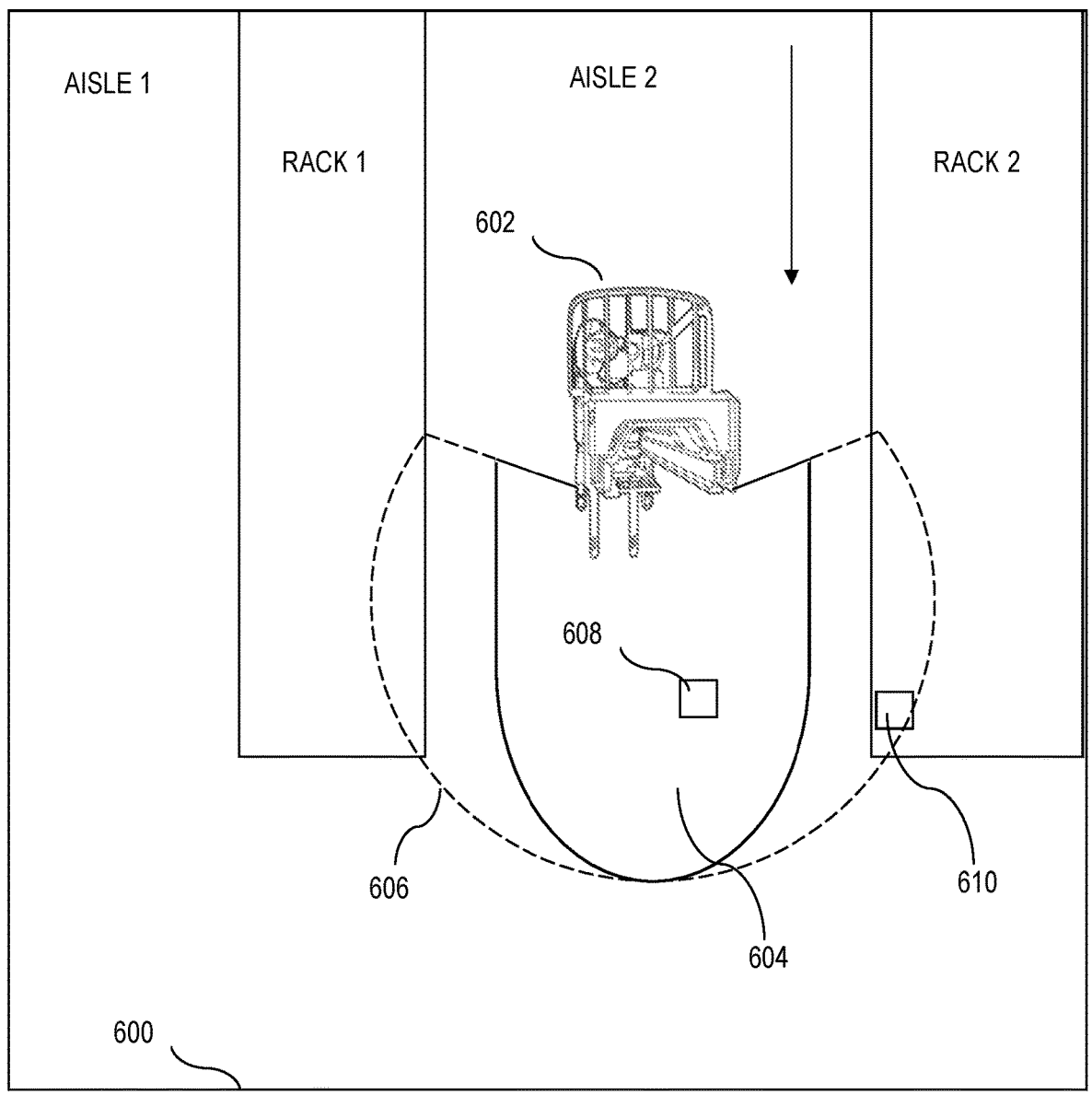
FIG. 6 illustrates an additional example implementation of an industrial vehicle that the process of FIG. 4 is executed upon according to aspects of the present disclosure.

FIG. 6 illustrates an industrial environment 600, an example of the process of FIG. 4. All references to FIG. 5 can incorporate the various systems, hardware, and embodiments disclosed in FIGS. 1-5 can be combined in any combination of components described with reference thereto. In this regard, not every disclosed component need be incorporated.

In FIG. 6, an industrial vehicle 602 travels through an aisle. An optical scanner (e.g., see 510 in FIG. 5) emits an obstacle detection signal comprising a first zone 604 and a second zone 606. The first zone 604 is within a travel path of the industrial vehicle 602, while the second zone 606 includes areas outside of the travel path of the industrial vehicle and includes areas behind a front of the industrial vehicle (i.e., behind the optical transmitter and detector). Obstacles include, but are not limited to debris, liquids, solid structures (e.g., pallets, tools, etc.), living organisms (humans, animals, etc.), indicators (e.g., optical tags), etc. Thus, if an object is detected in the second zone 606, but not the first zone 604, then that object is not in the travel path of the industrial vehicle.

In this regard, the process of FIG. 4 discriminates between an obstacle within the travel path of the industrial vehicle and an obstacle outside the travel path of the industrial vehicle. In FIG. 6, the first zone includes an object 608, and the second zone 606 includes a different object 610 (e.g., an optical tag).

When the object 608 in the first zone 604 is detected the process measures the signal value of the reflection and determines that the object is not an optical tag, but could be a pedestrian (e.g., the reflection is between 20-40% signal strength). Therefore, a first automated control (e.g., such as a hard brake) may automatically be applied to the industrial vehicle.

However, when the different object 610 in the second zone is detected, the signal value is indicative of an optical tag (e.g., the reflection is above 60% signal strength). Therefore, the optical tag is verified and the process (400 of FIG. 4) continues to transform, correlate, and apply an automated control, as described above. For example, in FIG. 6, the optical tag 610 may indicate an end of the aisle, and the status of the industrial vehicle is moving toward the end of the aisle. Therefore, an indication (e.g., visual, audial, haptic, etc.) may be provided to the operator to stop the industrial vehicle before proceeding out of the aisle.

Multiple Tag in Series Embodiment

As disclosed above, the process 400 with a single optical tag provides multiple options for applying automated controls on an industrial vehicle. By implementing additional optical tags, as described in greater detail below, the number of options for applying automated controls on an industrial vehicle increases as well.

Figure 7:
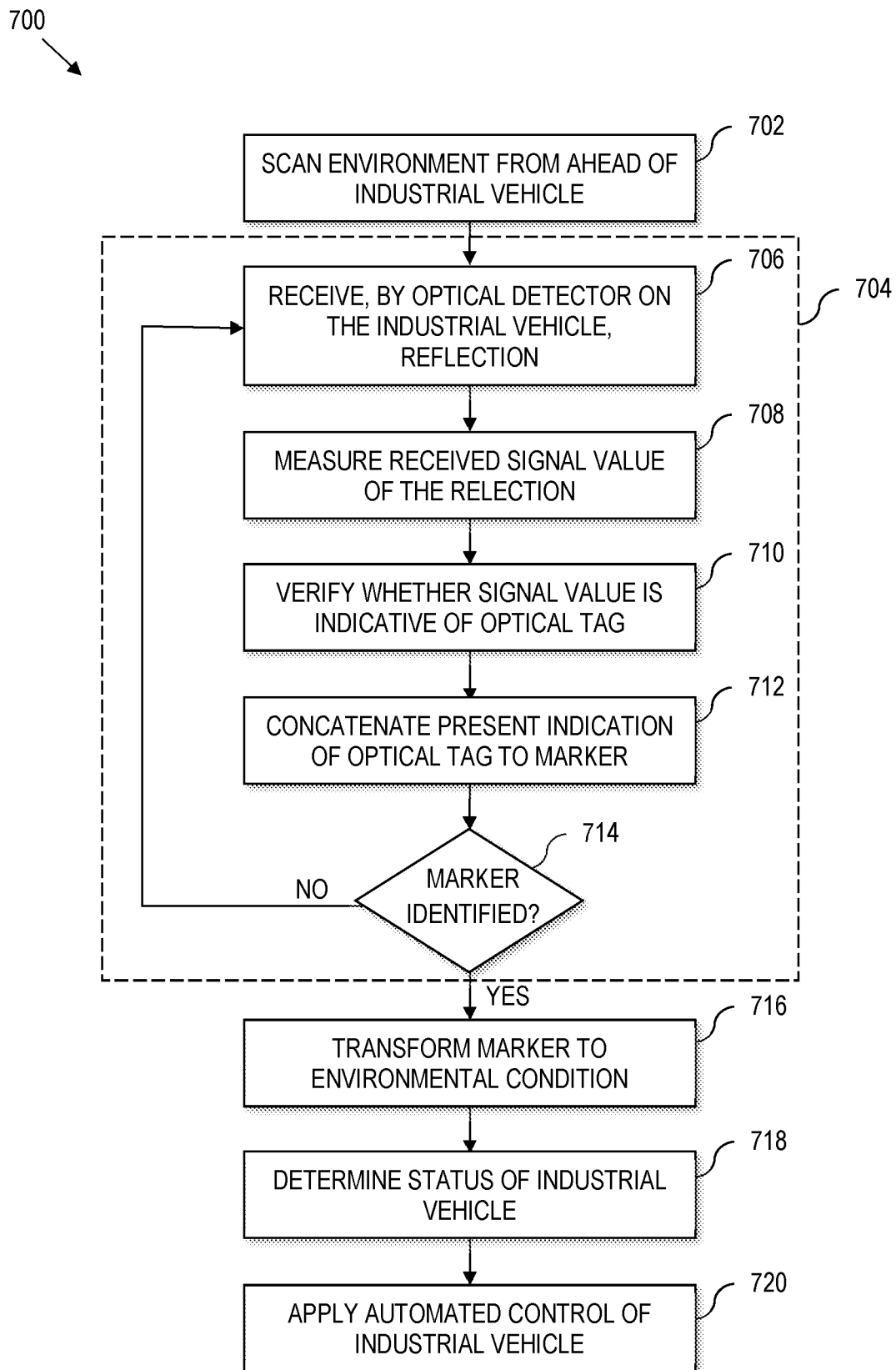
FIG. 7 is a flow chart directed toward an alternate embodiment of a process for automating control of an industrial vehicle based on location, according to aspects of the present disclosure.

Now referring to FIG. 7, a process 700 for automating control of an industrial vehicle based on location is disclosed. All references to the process 700 can incorporate the various systems, hardware and embodiments disclosed in FIGS. 1-6 and can be combined in any combination of components described with reference thereto. In this regard, not every disclosed component need be incorporated.

The process 700 comprises scanning at 702 an environment in a forward travel direction of the industrial vehicle, by using an optical scanner affixed to the industrial vehicle, wherein the optical scanner is fixed in an orientation that scans ahead of the forward travel direction of the industrial vehicle.

At 704, the process 700 includes identifying a marker defined by a series of tags. The marker is identified by finding a series of tags and concatenating those tags together to create the marker. To do this, the process 700 at 706 receives, by an optical detector on the industrial vehicle, a reflection indicative of a signal emitted by the optical scanner. Receiving the reflection is similar to receiving the reflection (404, FIG. 4) of the process for a single tag of FIG. 4.

Again, similarly to the process of FIG. 4, the process measures a received signal value of the reflection indicative of the signal emitted by the optical scanner at 708 and verifies whether the measured received signal value is indicative of an optical tag based upon the measured received signal value to create a present indication of an optical tag at 710.

In various embodiments, measuring the signal value of the reflections indicative of the signal emitted by the optical scanner comprises generating a first result if a signal value of an individual reflection of the series of reflections is lower than a first threshold (e.g., approximately 10% signal strength), a second result if the signal value of the reflection is between the first threshold and a second threshold (e.g., approximately 60% signal strength), and a third result if the signal value of the reflection is above the second threshold. The percentage ranges herein are for illustrative purposes and are non-limiting to the disclosure herein as more or few ranges may be utilized.

At 712, the process 700 concatenates the present indication of an optical tag to the marker. For example, if the indication of the optical tag is the first indication of an optical tag, then that indication starts the marker. Then, subsequent indications of optical tags are concatenated to the marker in the order that those indications are received. Thus, a series of optical tags are built up in sequential order into the marker.

The marker is a series of optical tags that includes at least two optical tags that are arranged in a sequence such that the optical tags are encountered at different times as the industrial vehicle moves.

In this regard, each optical tag within the series of optical tags includes its own signal value. For example, a first optical tag detected may indicate a start bit. Then, a second bit (i.e., a second value for an optical tag) is determined to be a first value (e.g., '1') if a second optical tag is detected within an amount of time (the amount of time may vary depending on a speed of the industrial vehicle). In other words, a first value is assigned to the second bit if a signal value is indicative of an optical tag received before a timer expires. However, if a second optical tag is not detected within the amount of time, then a second value (e.g. '0') is assigned to the second bit. This process may repeat until all bits for a given series of optical tags are determined, where the timer is reset between each bit. The resulting value of the bits in the series of optical tags may then be used as a code to determine an environmental condition.

Another example of aggregating multiple indications of optical tags into a value of a series of optical tags includes detecting a first optical tag as discussed above and assigning a value to the tag based on the signal value. For example, if the signal value is below a first threshold, then an optical tag is not detected. If the signal value is between the first threshold and a second threshold, then a first value is assigned to the optical tag. If the signal value is above the second threshold, then a second value is assigned to the optical tag. The same applies to all tags detected within a certain period of time, which are concatenated to create the marker. Instead of a certain period of time (which may or may not be based on a speed of the industrial vehicle), a preset number of optical tags may be used to indicate an end of the series of optical tags. For example, if the marker is defined as four optical tags in a series, once four optical tags are detected, the marker is complete.

A series of optical tags can be any number of optical tags that are arranged vertically (spaced apart from one another at varying heights), horizontally (spaced apart from each other at varying depths), or both. In an example, a series of optical tags is any number of optical tags arranged in a vertical sequence that are equally spaced from one another. In yet another example, a series of tags is any number of tags arranged in a horizontal sequence. In various embodiments, due to the fixed orientation of the optical scanner, the height from the floor to the optical scanner is known. Further, a relative angle of a scanning signal (i.e., laser) is also known. Thus, optical tags can be spaced so that the optical scanner scans the optical tags within the series of optical tags in a specific order regardless of an orientation of the series of the optical tags. In an example implementation, where the optical scanner is fixed in a downward orientation, the series of optical tags can be arranged in a vertical sequence where a bottom tag within the series of optical tags is scanned first. As the industrial vehicle travels forward, a subsequent optical tag is scanned by the optical scanner, and so on until all of the optical tags within the series of optical tags have been scanned. Alternatively, the optical scanner can be fixed in an upward orientation and achieve a similar result, except that the optical tags are scanned from the top down.

At 714, if the marker is not completely identified, then the process 700 loops back to 706 to receive more reflections and find more optical tags to concatenate to the marker. However, if at 714, the marker is completely identified, then the process proceeds to 716 to transform the marker into an environmental condition. At 718, a status of the industrial vehicle is determined, where the status correlates to the environmental condition. Then, at 720, an automated control is applied on the industrial vehicle based on the environmental condition and the status of the industrial vehicle.

The following examples provide further detail with respect to the process 700 of FIG. 7.

First Example of the Process of FIG. 7

Figure 8A:
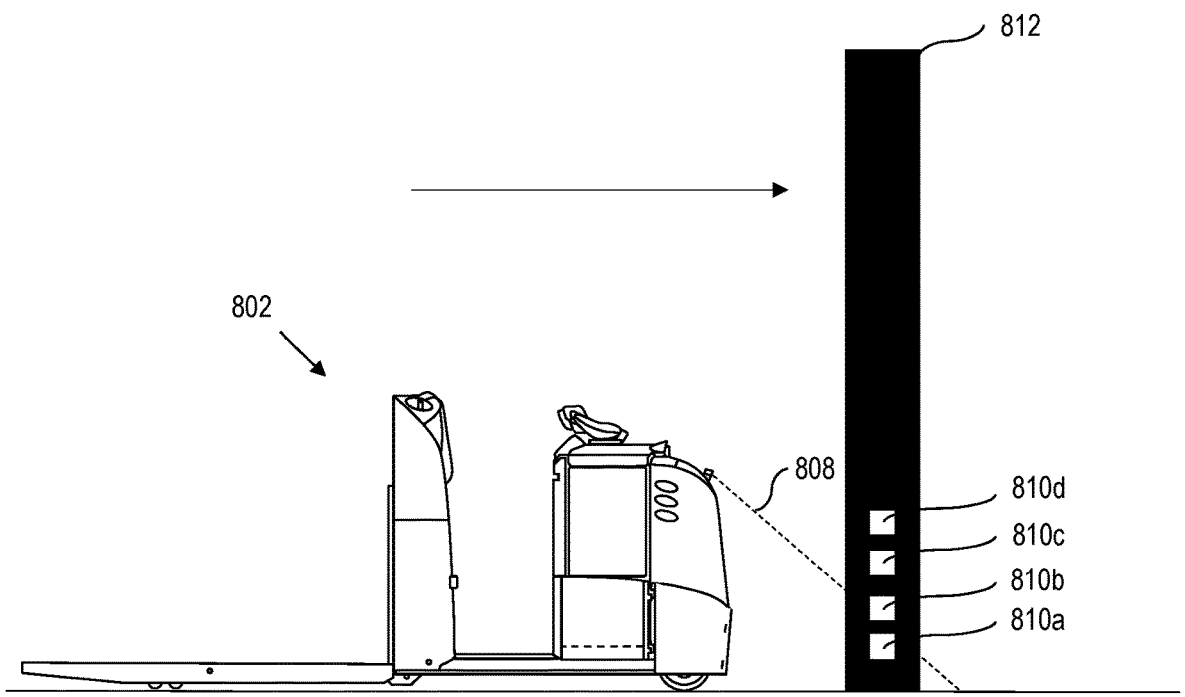
FIGS. 8A-8B illustrate example implementations of an industrial vehicle that the process of FIG. 7 is executed upon according to aspects of the present disclosure.
Figure 8B:
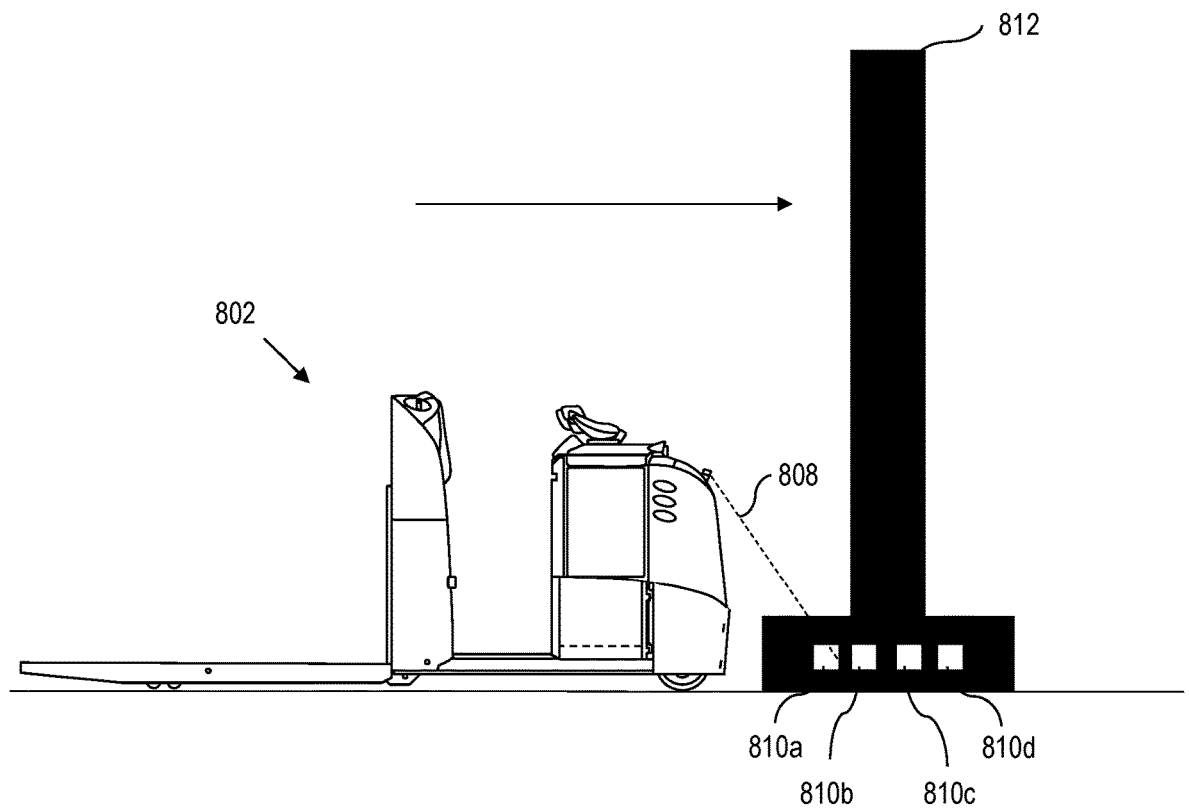

FIGS. 8A and 8B illustrate examples of the process of FIG. 7, as described above. The examples of FIGS. 8A and 8B are similar to the example to FIG. 5, except that the examples of FIGS. 8A and 8B depict four optical tags 810a-810d in a series and the reference numbers are 300 higher. Further, all references to FIGS. 8A and 8B can incorporate the various systems, hardware and embodiments disclosed in FIGS. 1-7 and can be combined in any combination of components described with reference thereto. In this regard, not every disclosed component need be incorporated. In FIG. 8A, the optical tags 810a-d are arranged vertically, while in FIG. 8B, the optical tags 810a-d are arranged horizontally.

In FIGS. 8A and 8B as the industrial vehicle 802 travels forward, a laser beam from the optical scanner 808 scans a first optical tag 810a. There are multiple embodiments or variations of the process 800 that dictate how the process 700 receives reflections from the optical tags and ultimately transforms the reflections into an environmental condition and an automated control.

For example, in a series of optical tags 810a-810d, there may be a start tag (e.g., the first optical tag) 810a and an end tag (e.g., the fourth optical tag) 810d. Thus, optical tags 810b and 810c produce reflection that are transformed into a marker that is associated with the environmental condition. In some embodiments, the start tag 810a and the end tag 810d are also part of the marker.

One advantage of utilizing a start tag and an end tag is error recognition with respect to the optical scanner 808. In this regard, errors can be identified through various approaches depending on the overall setup of the process 700.

For instance, if the optical scanner 808 scans optical tags 810b, 810c, and 810d (i.e., the end tag in this example), but not the first optical tag 810a, there may be an error that caused the optical scanner 808 not to scan the first optical tag 810a. If, in this example, the series of tags is always four tags (i.e., no tags can be missing), then the process may conclude that the optical scanner 808 is misaligned, which caused the optical scanner to miss the first optical tag 810a, or that the first optical tag 810a is covered or damaged. In the event the process detects an error (or a potential error), the process 700 will notify the operator of the industrial vehicle 802 accordingly, report a vehicle position and error to a server, or both.

Alternatively, in embodiments where a tag within the series of tags can be removed, the process can use data from the optical scanner (e.g., height and distance in relation to the optical tags) to interpolate which tag(s) have been removed (e.g., using a timer, as described herein).

In further embodiments, where the rack 812 reflects light at a signal value that is different than a signal value from a floor surface, the rack 812 itself can act as a pseudo start tag.

Alternatively, the process 700 may be pre-programmed to know that each series of tags comprise a certain number (e.g., four) of optical tags. When the laser beam scans the first optical tag 810a, the process 700 anticipates that more optical tags (in this case optical tags 810b-810d) will be read. Once all four optical tags are read, the optical tags are identified as a marker that can be used to find an environmental condition.

As disclosed above, in embodiments where the optical scanner 808 and laser beam are fixed in an orientation, the process 700 can estimate when and where optical tags will be scanned based on speed of the industrial vehicle as well as the height and distance of the optical tags in relation to the optical scanner 808 and laser beam. However, such estimation may be predicated upon the optical tags 810a-810d being placed in a consistent manner or pattern. In embodiments that utilize four optical tags, the process may further utilize a redundancy protocol, such as a checksum, to verify that four optical tags were scanned. If the checksum returns a sum fewer than four optical tags, the process 700 may produce an error result and notify the operator of the industrial vehicle.

While four optical tags 810a-810d are illustrated in FIG. 8, the process 700 does not require that all four optical tags 810a-810d are present. For example, if optical tag 810b is removed, the process 700 can identify or estimate which optical tag has been removed. In one example, the process 700 can use the height and distance of the optical tags (810a, 810c, and 810d in this instance) in relation to the optical scanner 808 and laser beam to interpolate a relative position of the removed optical tag 810b (i.e., where optical tag 810b would be positioned if the tag had not been removed). For clarity, an example of a series of tags with a tag within the series of tags removed is illustrated herein.

Second Example of the Process of FIG. 7

Now referring to FIGS. 9A-F, which illustrate an example implementation of an industrial vehicle 902, which the process 700 is executed thereon. FIGS. 9A-F are analogous to FIG. 8A, except that FIGS. 9A-F depict three optical tags 910a, 910c, and 910d in a series and the references numbers are 100 higher. Further, all references to FIGS. 9A-F can incorporate the various systems, hardware and embodiments disclosed in FIGS. 1-8B and can be combined in any combination of components described with reference thereto. In this regard, not every disclosed component need be incorporated.

In FIG. 9A, an industrial vehicle 902, which is being controlled by an operator remotely, scans via a laser beam (represented as a dashed line) an environment in a forward-facing direction (as indicated by the directional arrow) using an optical scanner 908. For this particular implementation, the optical scanner 908 comprises an optical scanner and an optical detector that receives reflections, and the process 700 has been programmed so that each series of tags has four optical tags. However, all four optical tags do not have to be present (i.e., the process can interpolate the missing tags (e.g., using a timer)).

The laser beam from the optical scanner 908 reflects off of various items, such as a series of optical tags (e.g., 910a, 910c, and 910d) and a rack 912, back to the optical scanner 908. In FIG. 9A, the laser beam from the optical scanner 908 has not scanned the series of optical tags 910a, 910c, and 910d, thus a marker 914 is shown as X-X-X-X, wherein X denotes a null or missing value.

In FIG. 9B, the laser beam scans optical tag 910a, thus receiving the reflection from optical tag 910a. In various embodiments, the first optical tag 910a is a start tag (i.e., a start bit) that indicates to the process that a series of tags is present. In numerous embodiments, the first optical tag 910a is read as an optical tag as disclosed herein. Further, in various embodiments the process 700 can measure a signal value of the reflection from optical tag 910a when the reflection is received by the optical scanner 908 and verify that the reflection is indicative of an optical tag based upon the measured signal value exceeding a predetermined threshold. In any embodiment, the reflection from optical tag 910a prompts the process 700 to concatenate the indication of the optical tag to the marker 914. Thus, the marker is 1-X-X-X at this point.

In FIG. 9C, optical tag 910b is missing. Thus, the laser beam will not scan optical tag 910b and a timer should time out, which results in the marker being 1-0-X-X. In various embodiments without a timer, the resulting marker may be 1-X-X-X, because there is not a value to record or any indication that an optical tag is present. Thus, the process 700 may delay coding optical tag 810b as "0" until the end tag (i.e., 910d) is scanned.

In FIG. 9D, the laser beam scans optical tag 910c. Similar to FIG. 9b, the process 700 revises the marker to 1-0-1-X.

In FIG. 9E, the laser scans optical tag 910d. Similar to FIGS. 9B and 9D, the process 700 revises the marker to 1-0-1-1. In this example embodiment, the marker 914 is complete and is transformed into an environmental condition associated with the value 1-0-1-1. The environmental condition for this example is a requirement that a light 916 on the industrial vehicle must strobe when crossing to the right side of the rack 912 as shown in FIG. 9E. Further, the status of the industrial vehicle that correlates to the environmental condition is determined to be "travelling forward" toward the rack 912. Thus, an automated control of strobing a light 916 on the industrial vehicle is applied to the industrial vehicle 902.

In FIG. 9F, which illustrates the process 700 resetting the marker 914 after the industrial vehicle 902 has strobed its light. Note that optical tag 910a is blocked by the industrial vehicle 902 as it passes by the rack 912.

In multiple embodiments, a first tag within the series of tags (e.g., 910a) may be removed as well. For example, a marker may read 0-1-1-1. Interpolating the "0" may be accomplished in various manners such as designating a predefined number of optical tags for the series of optical tags, comparing the predefined number of optical tags against a total number of measured signal values indicative of the series of optical tags, and interpolating which optical tags within the series of optical tags is missing (if the predefined number of optical tags is different than the total number of measured RSSI values indicative of the series of optical tags).

For instance, if the process 700 is programmed so that each series of tags has four optical tags but does not require that all four optical tags have to be present, a second tag (e.g., 910b) can be coded as a start tag. In such a case, after tags 910b-d have been scanned, wherein 910d is an end tag, the marker can read X-1-1-1. However, since the process has been programmed for four tags, and no gaps between the tags 910b-d were detected, the process 700 can interpolate the marker of optical tag 910a as "0". Further, verification of optical tag counts can be performed via a checksum or a similar mechanism.

The values given to the optical tags in the marker in this example are binary. However, in other examples, the tags may have more than two options for values (e.g., using multiple thresholds).

Multiple Optical Tags in Parallel

Figure 10:
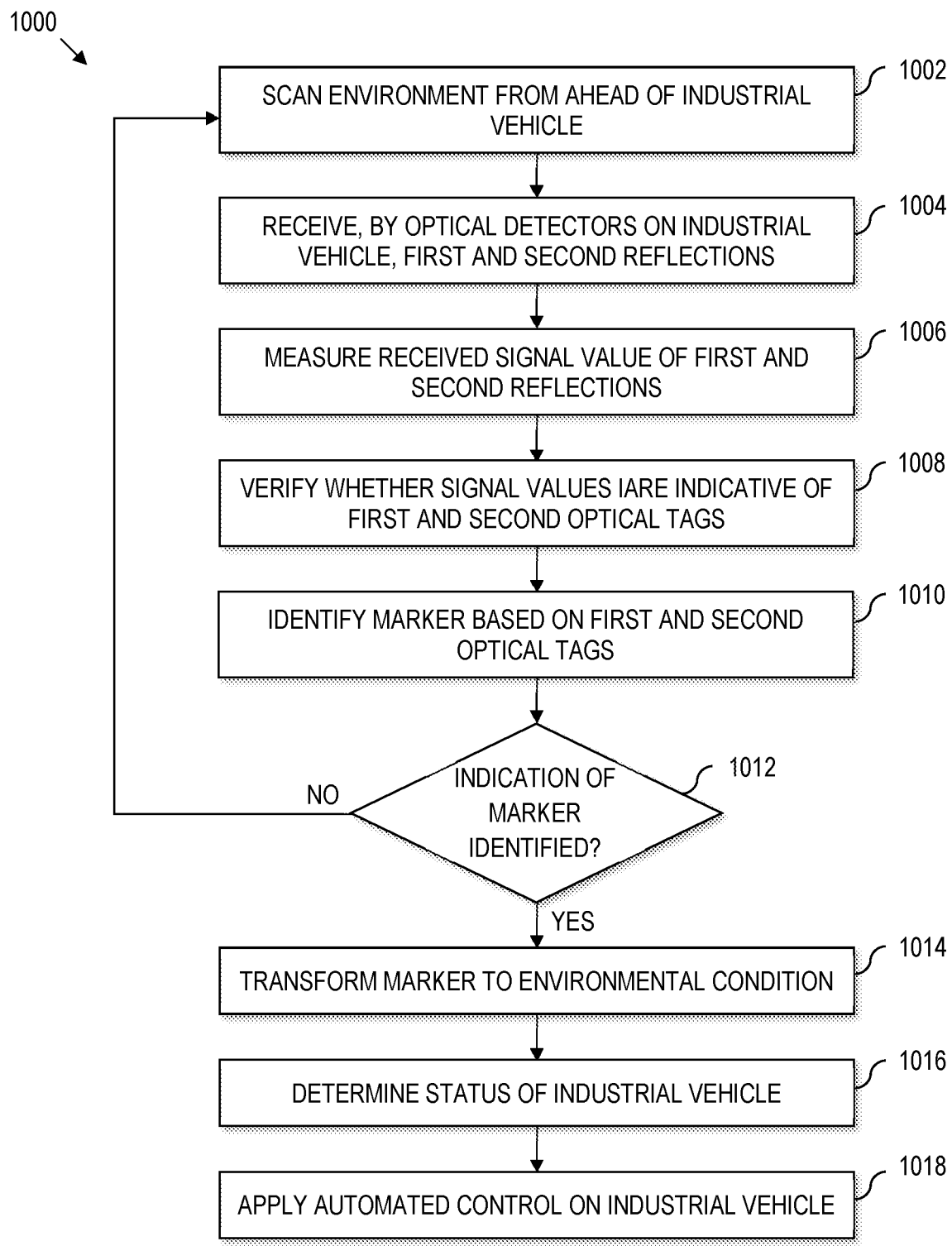
FIG. 10 is a flow chart directed toward yet another embodiment for a process for automating control of an industrial vehicle based on location, according to aspects of the present disclosure.

Now referring to FIG. 10, a process 1000 for automating control of an industrial vehicle based on location is disclosed. All references to FIG. 10 can incorporate the various systems, hardware and embodiments disclosed in FIGS. 1-9 and can be combined in any combination of components described with reference thereto. In this regard, not every disclosed component need be incorporated.

The process 1000 comprises scanning at 1002 an environment in a forward travel direction of the industrial vehicle, by using a first optical scanner affixed to the industrial vehicle, and a second optical scanner affixed to the industrial vehicle, wherein the first optical scanner and the second optical scanner are fixed in an orientation that scans ahead of and alongside the forward travel direction of the industrial vehicle.

In this regard, the optical scanners may be arranged in any number of configurations. For instance, the optical scanners may be arranged in a vertical line, where a detection distance for each optical scanner is dictated through associated software, intensity, or both. In various embodiments, the optical scanners may be vertically staggered from one another. For example, the first optical scanner may be disposed on a front most end of the industrial vehicle, and the second optical scanner may be disposed above the first optical scanner and behind the front most end of the industrial vehicle.

Figure 11A:
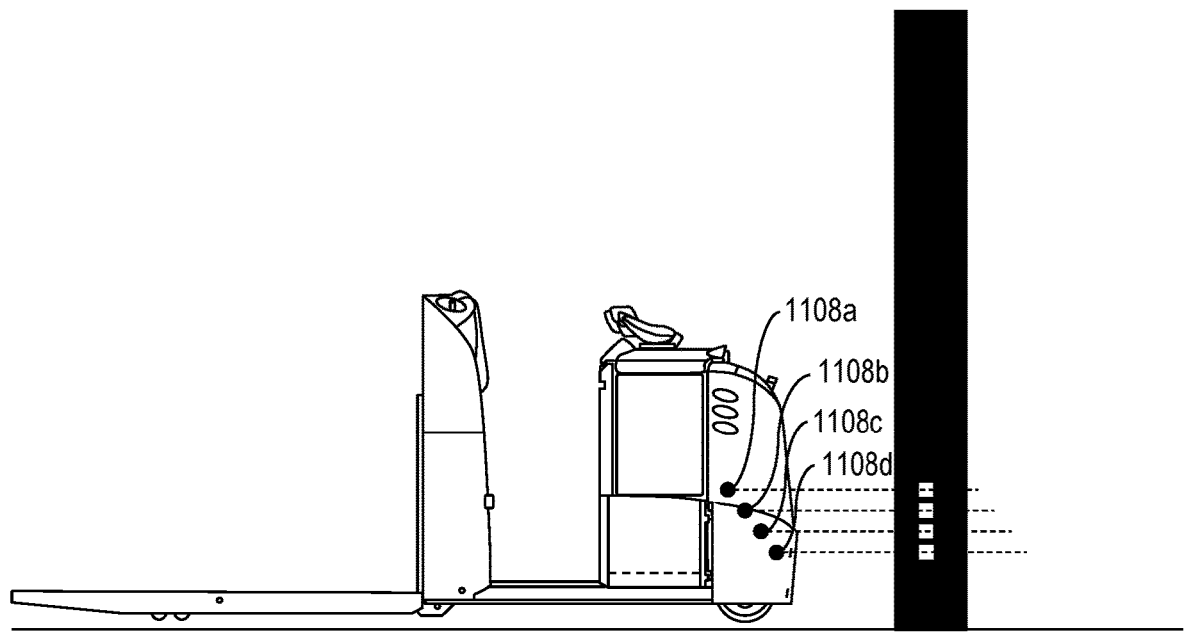
FIGS. 11A-11B illustrate an example implementation of an industrial vehicle that the process of FIG. 10 is executed upon according to aspects of the present disclosure.
Figure 11B:
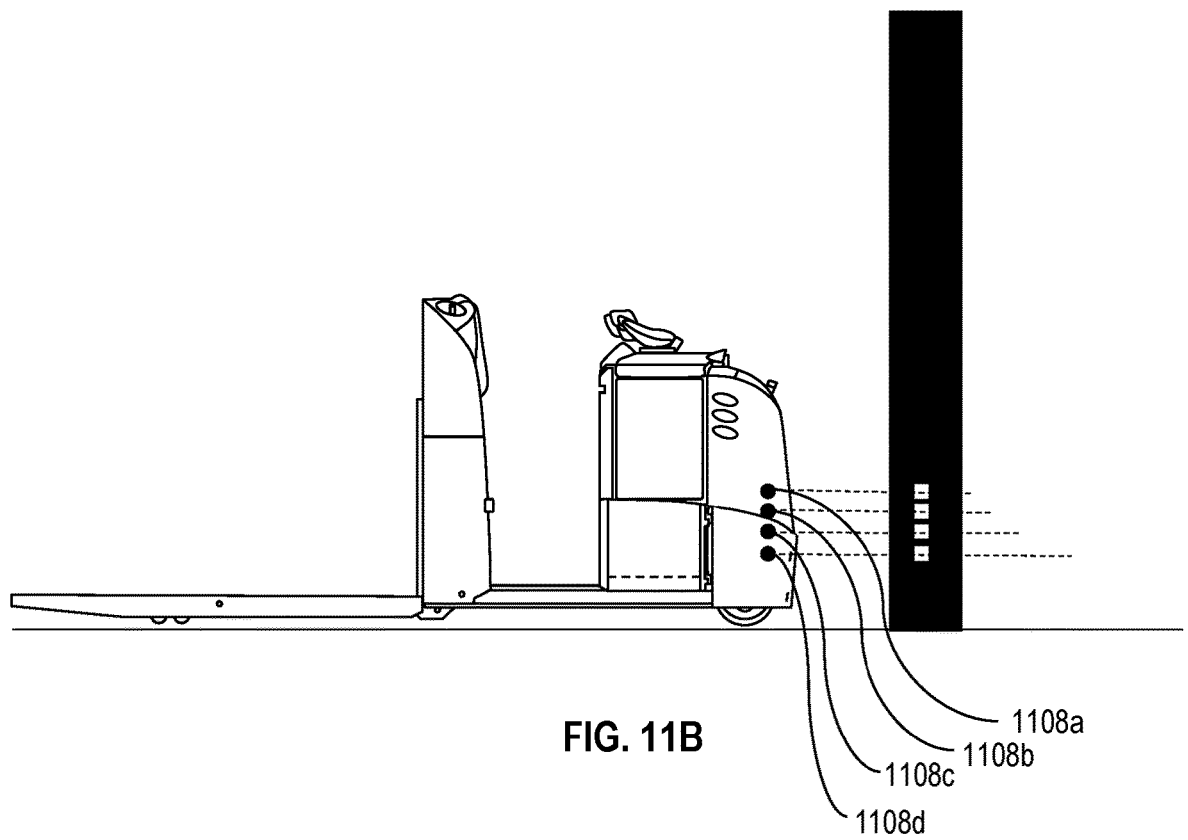

In embodiments that have a third optical scanner, the third optical scanner is disposed above the second optical scanner and yet further behind the front most end of the industrial vehicle, and so on. Examples of the vertically staggered and vertical line optical scanner configurations are illustrated in FIGS. 11A and 11B, respectively, wherein the optical scanners are illustrated as dots with dotted lines extending therefrom. Four optical scanners 1108a-d are shown in each figure for illustrative purposes and are by no means limiting in scope.

At 1004, the process 1000 comprises receiving a first reflection indicative of a signal emitted by the first optical scanner, and a second reflection indicative of a signal emitted by the second optical scanner. In some embodiments, the industrial vehicle may have a third and a fourth optical detector which receive a third reflection and a fourth reflection respectively. Thus, instead of serially detecting the optical tags into a pattern (i.e., the process of FIG. 7), the optical tags are detected in parallel with multiple optical detectors.

At 1006, the process 1000 comprises measuring a received signal value of the first reflection indicative of the signal emitted by the optical scanner and measuring a received signal value of the second reflection indicative of the signal emitted by the optical scanner. In further embodiments, wherein the industrial vehicle utilizes the third and fourth optical detector, the process 1000 measures a received signal value of the third reflection, and the fourth reflection as well. As with the single tag process and the series of tag process, the received signal value may be a received signal strength indicator (RSSI) value.

At 1008, the process 1000 comprises verifying whether the first measured received signal value is indicative of a first optical tag based upon the first measured received signal value to create an indication of a first optical tag and verifying whether the second measured received signal value is indicative of a second optical tag based upon the second measured received signal value to create an indication of a second optical tag.

At 1010, the process 1000 comprises identifying a marker based on the first and second indications of first and second optical tags, respectively. In cases with more than two optical scanners, all or some of the optical tags may be used to identify the marker.

If at 1012, the marker is not identified (because the tags were not detected), then the process loops back to 1004. However, if a marker is identified, then the process proceeds to 1014 to transform the marker into an environmental condition. At 1016, a status of the industrial vehicle is determined, where the status correlates to the environmental condition. Then, at 1018, an automated control is applied on the industrial vehicle based on the environmental condition and the status of the industrial vehicle.

Determining Travel Direction

As discussed above, a marker may be absolute (i.e., is not dependent on a travel direction of the industrial vehicle) or relative (i.e., is dependent on a travel direction of the industrial vehicle). Therefore, in cases of relative markers, the travel direction of the industrial vehicle must be determined.

In some embodiments, the travel direction may be determined through the use of one marker. For example, most optical scanner/detectors can detect a direction from which a reflection is received. Therefore, it is possible to identify which side of an aisle an object (e.g., a tag, a marker, etc.) resides. As such, if there is only one marker at a position in an aisle, then when the position of that marker is determined relative to the industrial vehicle, a direction of the industrial vehicle is known. For example, if the marker is on the right side of the aisle, then the industrial vehicle is travelling in a first direction. Continuing with the example, if the marker is found on the left side of the aisle, then the industrial vehicle is travelling in a second direction (e.g., opposite the first direction).

As an example and referring back to FIG. 5, when the industrial vehicle 502 passes an optical tag 512 in a first direction 516, where the optical tag 512 is to the left of the industrial vehicle 502, the system knows that due to the optical tag 512 being on the left and the value of the marker, that the industrial vehicle is travelling from a remote-control-allowed zone (first zone) 504 to a remote-control-prohibited zone (second zone) 506. Similarly, if the industrial vehicle 502 travels in a second direction (e.g., opposite the first direction), then the optical tag 512 is to the right of the industrial vehicle 502. Thus, the system knows that due to the optical tag 512 being on the right and the value of the marker, that the industrial vehicle 502 is travelling from the remote-control-prohibited zone (second zone) 506 to the remote-control-allowed zone (first zone) 504.

In numerous embodiments, markers are present on both sides of the aisle, and both markers are used to relay a single environmental condition, which allows for twice as many tags to be present for encoding the environmental condition. Thus, if markers are four tags in length, then the environmental condition can be coded as eight bits (i.e., two-hundred-fifty-six different possibilities) of information. Such a scheme can be used to resolve travel direction of the industrial vehicle. For example, with two-hundred-fifty-six different possibilities, there may be less than half actual environmental conditions. Thus, at least half of the encoded pairs of markers may be tied to no environmental condition. For example, a first marker may have an encoded value of 1101, and a second marker may have an encoded value of 1001. Further, in this example, the left marker is seen as the most significant bits, while the right marker is seen as the least significant bits. Moreover, in this example, when the industrial vehicle is traveling in a first direction, the first marker is on the left, and the second marker is on the right; when the industrial vehicle is traveling in a second direction, the second marker is on the left, and the first marker is on the right. Thus, when the industrial vehicle travels in the first direction, the encoded value of the markers is: 1101 1001. Conversely, when the industrial vehicle travels in the second direction, the encoded value of the markers is: 1001 1101. If 1101 1001 is encoded as an environmental condition that indicates that the vehicle in transitioning to another zone (e.g., see FIG. 5) and 1001 1101 is not encoded as any environmental condition, so the markers are ignored in the second direction. Thus, the marker is not transformed into an environmental condition.

In various embodiments, markers are present on both sides of the aisle, both markers are associated to relay a single environmental condition, and one of the tags of each marker indicates a direction. The tags that are used to indicate direction should have opposing binary values, so when the left tag reads 'zero' and the right tag reads 'one,' the system knows that the industrial vehicle is travelling in a first direction. Correspondingly, when the left tag reads 'one' and the right tag reads 'zero,' the system knows that the industrial vehicle is travelling in a second direction (e.g., opposite the first direction). The rest of the tags in the markers may then be used to relay an environmental condition. For example, if two markers with four tags are present in an aisle (one marker on each side of the aisle), the first tag on both markers (two tags total in this example) may be used to determine the direction and then the second through fourth tags on each marker (six tags total in this example) can be used to encode the environmental condition. In another example, if two markers with four tags are present in an aisle (one marker on each side of the aisle), the first tag on both markers (two tags total in this example) may be used to determine the direction and then the second through fourth tags on only one of the markers (depending on the direction) is used to encode the environmental condition.

Figure 12A:
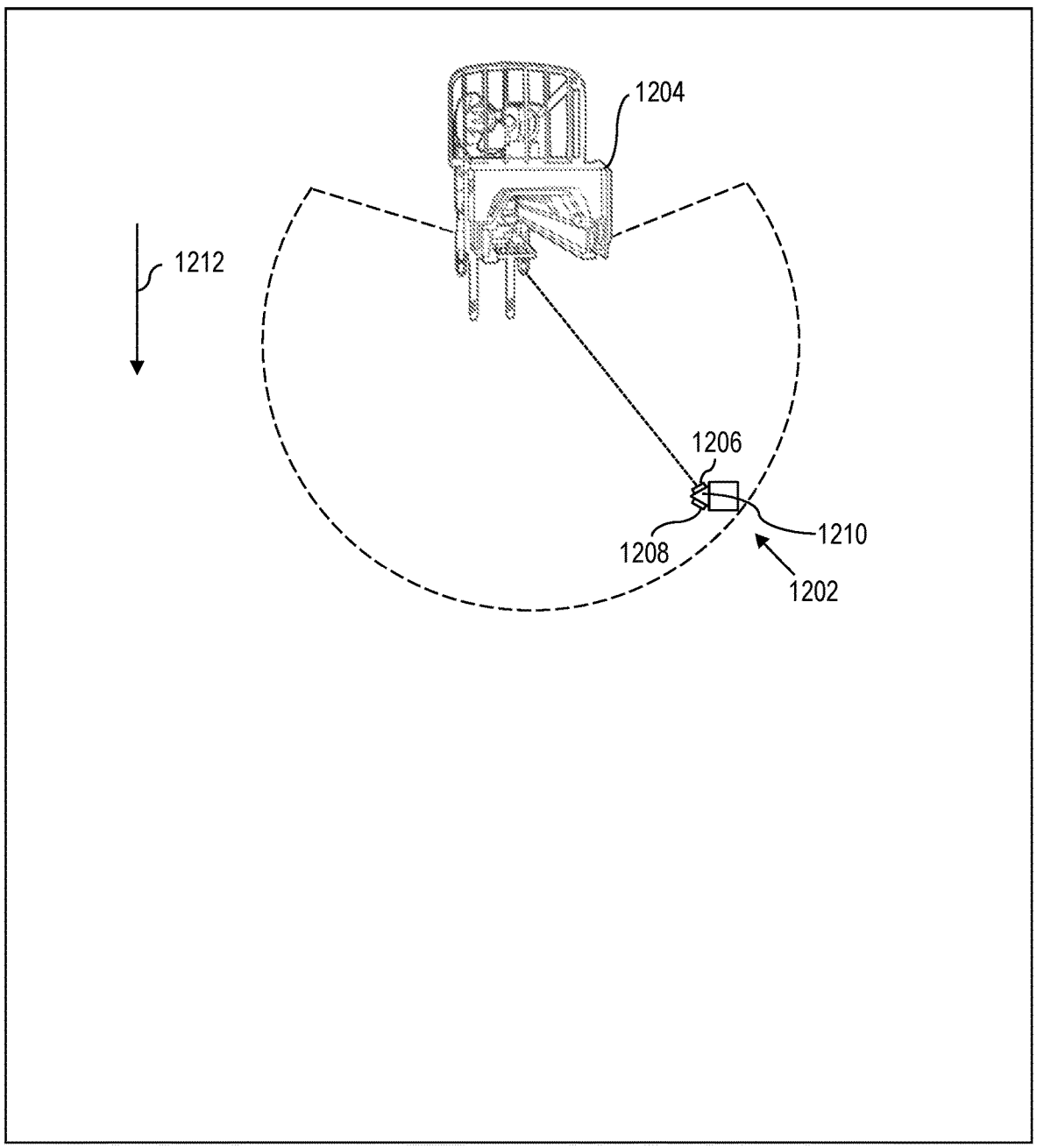
FIGS. 12A-12B illustrate a three-dimensional tag that includes information in more than one direction, where
Figure 12B:
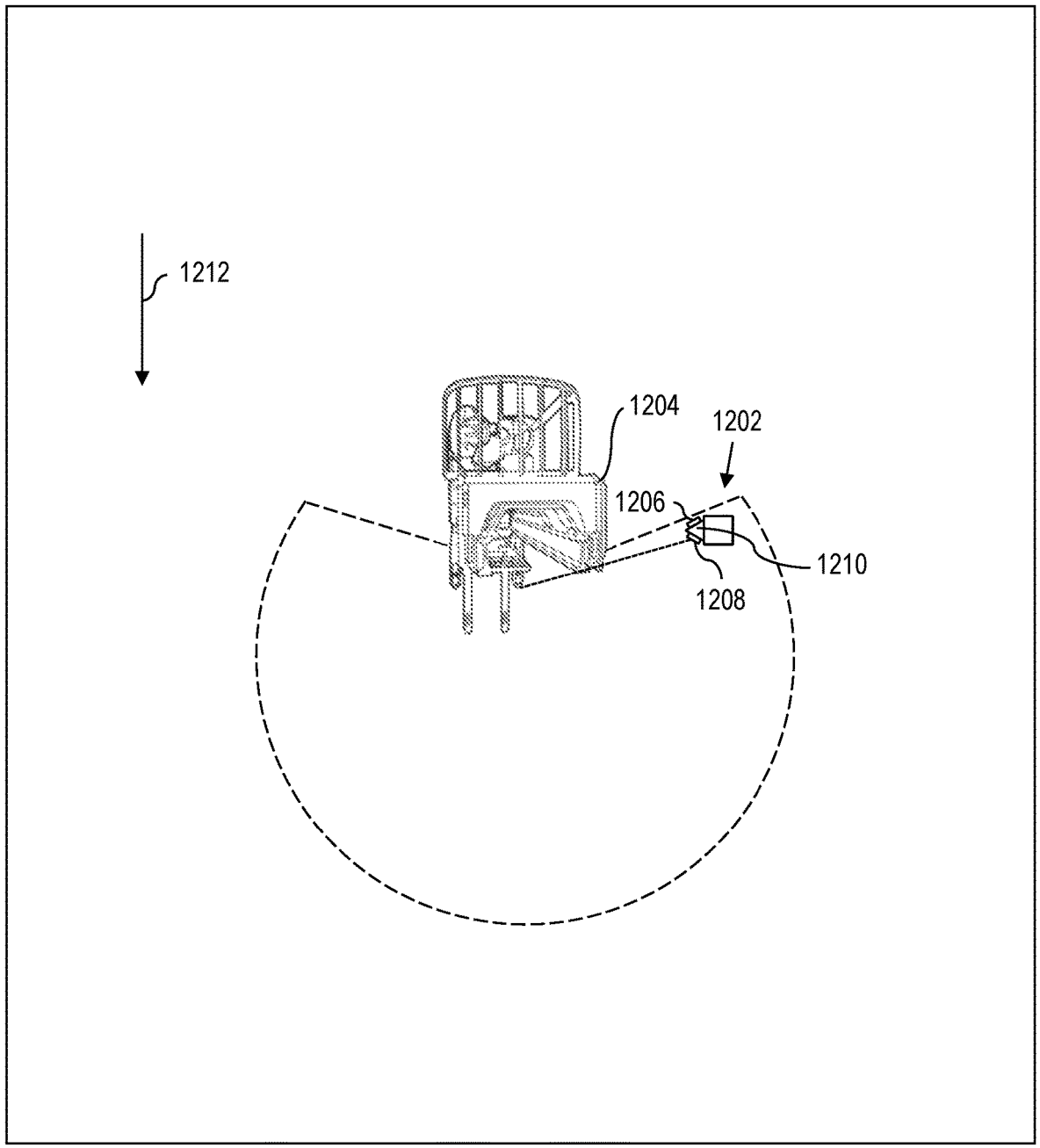

Turning to FIGS. 12A-B, in various embodiments, three-dimensional tags 1202 may be used to create markers. As discussed above (see FIG. 6), the range of an optical scanner may extend behind the front of the industrial vehicle 1204. A three-dimensional tag 1202 includes a first face 1206 and a second face 1208 with information, each coupled to a mount 1210 that may be placed on any desired surface (e.g., pillar, stanchion, post, shelf, etc.). In FIGS. 12A-B, a three-dimensional tag 1202 is shown at two points in time relative to the industrial vehicle 1204. The tag 1202 in FIG. 12A shows the tag 1202 as the industrial vehicle 1204 first sees the tag 1202, while the industrial vehicle is travelling in a first direction 1212. Thus, the optical scanner sees the first face 1206 first. Then as the industrial vehicle 1204 travels, the three-dimensional tag 1202 ends up behind the industrial vehicle, as shown in FIG. 12B. The optical scanner picks up the second face 1208 when the tag 1202 is behind the front of the industrial vehicle 1204. Therefore, two different measurements can be made for the same tag at different times.

The processes and systems described herein can be used to automatically control industrial vehicles based on optical tags that are not within the travel path of the industrial vehicle. Further, if an industrial vehicle already has an optical scanner to detect objects, then no additional scanners are required.

Miscellaneous

As will be appreciated by one skilled in the art, aspects of the present disclosure may be embodied as a system, method or computer program product. Moreover, some aspects of the present disclosure may be implemented in hardware, in software (including firmware, resident software, microcode, etc.), or by combining software and hardware aspects. Furthermore, aspects of the present disclosure may take the form of a computer program product embodied in one or more computer readable storage medium(s) having computer readable program code embodied thereon.

In certain embodiments, any combination of one or more computer readable medium(s) may be utilized. The computer readable medium may be a computer readable storage medium or a computer readable signal medium. A computer readable storage medium may be a primary storage device, or a secondary storage device (which may be internal, external, or removable from the host hardware processing device). Examples of a computer readable storage medium include, but not limited to, a portable computer diskette, a hard disk, a random access memory (RAM), a read-only memory (ROM), an erasable programmable read-only memory (EPROM), Flash memory, a portable compact disc read-only memory (e.g., CD-ROM, CD-R, CD-RW, DVD, Blu-Ray), or any suitable combination of the foregoing. In the context of this document, a computer readable storage medium may be any tangible (hardware) medium that can contain, or otherwise store a program for use by or in connection with an instruction execution system, apparatus, or device.

A computer readable signal medium may include a propagated data signal with computer readable program code embodied therein, for example, in baseband or as part of a carrier wave. Specifically, a computer readable signal medium is not a computer readable storage medium, and a computer readable storage medium is not a computer readable signal medium.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. Aspects of the disclosure were chosen and described in order to best explain the principles of the disclosure and the practical application, and to enable others of ordinary skill in the art to understand the disclosure for various embodiments with various modifications as are suited to the particular use contemplated.

What is claimed is:

1. A process for automating control of an industrial vehicle based on location, the process comprising:
   scanning an environment using an optical scanner affixed to the industrial vehicle, wherein the optical scanner is fixed in an orientation that scans in a travel direction of the industrial vehicle;
   identifying a marker defined by a series of optical tags by recursively:
      receiving, by an optical detector on the industrial vehicle, a reflection indicative of a signal emitted by the optical scanner;
      measuring a received signal value of the reflection indicative of the signal emitted by the optical scanner;
      verifying whether the measured received signal value is indicative of an optical tag based upon the measured received signal value to create a present indication of the optical tag; and
      concatenating the present indication of the optical tag to the marker; and
   performing, based on the identified marker:
      transforming the marker into an environmental condition;
      determining a status of the industrial vehicle, wherein the status correlates to the environmental condition; and
      applying an automated control on the industrial vehicle based on the environmental condition and the status of the industrial vehicle.

2. The process of claim 1, wherein concatenating the present indication of the optical tag to the marker comprises:
   determining that a first optical tag is indicative of a start bit;
   determining a second optical tag in the series of optical tags by:
      assigning a first value to the second optical tag if the signal value indicative of an optical tag is received before a timer expires; and
      assigning a second value different than the first value to the second optical tag if no signal value indicative of an optical tag is received before the timer expires.

3. The process of claim 2 further comprising:
   resetting the timer when the second optical tag of the series of optical tags is assigned; and
   determining a third optical tag in the series of optical tags by:
      assigning the first value to the third optical tag if a signal value indicative of an optical tag is received after the second optical tag is assigned but the timer expires; and
      assigning the second value to the third optical tag if no signal value indicative of an optical tag is received after the second optical tag is assigned and the timer expires.

4. The process of claim 1, wherein concatenating the present indication of the optical tag to the marker comprises concatenating the present indication of the optical tag to the marker, based on a sequential order in which the series of optical tags were received.

5. The process of claim 1, wherein measuring the received signal value of the reflection indicative of the signal emitted by the optical scanner comprises generating:
   a first result if the received signal value of the reflection is lower than a first threshold,
   a second result if the received signal value of the reflection is between the first threshold and a second threshold, and
   a third result if the received signal value of the reflection is greater than the second threshold.

6. The process of claim 1, wherein concatenating the present indication of the optical tag to the marker comprises concatenating the present indication of the optical tag to the marker until a predetermined number of optical tags have been concatenated to the marker.

7. The process of claim 1, wherein concatenating the present indication of the optical tag to the marker comprises concatenating the present indication of the optical tag to the marker until an end indicator optical tag is received.

8. The process of claim 1, wherein applying the automated control on the industrial vehicle based on the environmental condition and the status of the industrial vehicle comprises at least one of:
   generating a visual cue,
   activating an alarm on the industrial vehicle, or
   overriding a manual travel control system of the industrial vehicle.

9. The process of claim 1, wherein scanning the environment comprises scanning the environment by using an obstacle detection signal.

10. The process of claim 9 further comprising discriminating between an obstacle within a travel path of the industrial vehicle, and an obstacle outside the travel path of the industrial vehicle.

11. The process of claim 10 further comprising:
applying a first automated control on the industrial vehicle in response to the obstacle within the travel path of the industrial vehicle, and a second automated control on the industrial vehicle in response to the obstacle outside the travel path of the industrial vehicle.

12. The process of claim 1 further comprising determining the travel direction of the industrial vehicle based on the marker;
wherein transforming the marker into the environmental condition is further based on the travel direction of the industrial vehicle.

13. The process of claim 12, wherein determining the travel direction of the industrial vehicle based on the marker comprises:
determining a direction of the marker in relation to the industrial vehicle, wherein the travel direction of the industrial vehicle is further based on the direction of the marker in relation to the industrial vehicle.

14. The process of claim 12, wherein determining the travel direction of the industrial vehicle based on the marker comprises:
determining a direction of the marker in relation to the industrial vehicle, wherein the marker is a first marker;
determining a direction of a second marker in relation to the industrial vehicle; and
determining the travel direction of the industrial vehicle based on a tag of the first marker, a corresponding tag of the second marker, the direction of the first marker in relation to the industrial vehicle, and the direction of the second marker in relation to the industrial vehicle.

15. A process for automating control of an industrial vehicle based on location, the process comprising:
scanning an environment using an optical scanner affixed to the industrial vehicle, wherein the optical scanner is an obstacle detection scanner and scans in a travel direction of the industrial vehicle;
receiving, by an optical detector on the industrial vehicle, a reflection indicative of a signal emitted by the optical scanner;
measuring a received signal value of the reflection indicative of the signal emitted by the optical scanner;
verifying whether the measured received signal value is indicative of an optical tag based upon the measured received signal value to create an indication of the optical tag;
transforming the indication of the optical tag into an environmental condition;
determining a status of the industrial vehicle, wherein the status correlates to the environmental condition; and
applying an automated control on the industrial vehicle based on the environmental condition and the status of the industrial vehicle.

16. The process of claim 15, wherein measuring the received signal value of the reflection indicative of the signal emitted by the optical scanner comprises generating:
a first result if the received signal value of the reflection is lower than a first threshold,
a second result if the received signal value of the reflection is between the first threshold and a second threshold, and
a third result if the received signal value of the reflection is greater than the second threshold.

17. The process of claim 15, wherein applying the automated control on the industrial vehicle based on the environmental condition and the status of the industrial vehicle comprises at least one of:
generating a visual cue,
activating an alarm on the industrial vehicle, or
overriding a manual travel control system of the industrial vehicle.

18. The process of claim 15 further comprising:
discriminating between an obstacle within a travel path of the industrial vehicle, and an obstacle outside the travel path of the industrial vehicle; and
applying a first automated control on the industrial vehicle in response to the obstacle within the travel path of the industrial vehicle, and a second automated control on the industrial vehicle in response to the obstacle outside the travel path of the industrial vehicle.

19. A process for automating control of an industrial vehicle based on location, the process comprising:
scanning an environment using a first optical scanner affixed to the industrial vehicle, and a second optical scanner affixed to the industrial vehicle, wherein the first optical scanner and the second optical scanner scan in a travel direction of the industrial vehicle;
receiving a first reflection indicative of a signal emitted by the first optical scanner, and a second reflection indicative of a signal emitted by the second optical scanner;
measuring a received signal value of the first reflection indicative of the signal emitted by the first optical scanner;
measuring a received signal value of the second reflection indicative of the signal emitted by the second optical scanner;
verifying whether the first measured received signal value is indicative of a first optical tag based upon the first measured received signal value to create an indication of the first optical tag;
verifying whether the second measured received signal value is indicative of a second optical tag based upon the second measured received signal value to create an indication of the second optical tag;
creating a marker based on the first optical tag and the second optical tag;
transforming the marker into an environmental condition;
determining a status of the industrial vehicle, wherein the status of the industrial vehicle correlates to the environmental condition; and
applying an automated control on the industrial vehicle based on the environmental condition and the status of the industrial vehicle.

20. The process of claim 19 further comprising:
scanning an environment using a third optical scanner affixed to the industrial vehicle, and a fourth optical scanner affixed to the industrial vehicle, wherein the third optical scanner and the fourth optical scanner are fixed in an orientation that scans in the travel direction of the industrial vehicle;
receiving a third reflection indicative of a signal emitted by the third optical scanner, and a fourth reflection indicative of a signal emitted by the fourth optical scanner;

measuring a received signal value of the third reflection indicative of the signal emitted by the third optical scanner;
measuring a received signal value of the fourth reflection indicative of the signal emitted by the fourth optical scanner;
verifying whether the third measured received signal value is indicative of a third optical tag based upon the third measured received signal value to create an indication of the third optical tag; and
verifying whether the fourth measured received signal value is indicative of a fourth optical tag based upon the fourth measured received signal value to create an indication of the fourth optical tag;

wherein:

creating a marker based on the first optical tag and the second optical tag comprises making the marker based on the first optical tag, the second optical tag, the third optical tag, and the fourth optical tag.

* * * * *